US011876798B2

(12) United States Patent
Suresh et al.

(10) Patent No.: US 11,876,798 B2
(45) Date of Patent: Jan. 16, 2024

(54) VIRTUAL DELIVERY APPLIANCE AND SYSTEM WITH REMOTE AUTHENTICATION AND RELATED METHODS

(71) Applicant: CITRIX SYSTEMS, INC., Fort Lauderdale, FL (US)

(72) Inventors: Ashwin Suresh, Pompano Beach, FL (US); Jason Vega Paez, Boca Raton, FL (US); Georgy Momchilov, Parkland, FL (US); Jayadev Marulappa Niranjanmurthy, Parkland, FL (US); Mark D. Howell, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 352 days.

(21) Appl. No.: 16/876,289

(22) Filed: May 18, 2020

(65) Prior Publication Data

US 2020/0374284 A1 Nov. 26, 2020

Related U.S. Application Data

(60) Provisional application No. 62/850,099, filed on May 20, 2019.

(51) Int. Cl.
*H04L 9/40* (2022.01)
*H04L 9/32* (2006.01)
(Continued)

(52) U.S. Cl.
CPC ........ *H04L 63/0861* (2013.01); *H04L 9/3271* (2013.01); *H04L 63/0853* (2013.01);
(Continued)

(58) Field of Classification Search
None
See application file for complete search history.

(56) References Cited

U.S. PATENT DOCUMENTS 6,081,900 A * 6/2000 Subramaniam ..... H04L 63/0807
 713/153
6,751,733 B1 * 6/2004 Nakamura ............. G06F 21/32
 713/182

(Continued)

OTHER PUBLICATIONS

Vapen "Web Authentication using Third-Parties in Untrusted Environments," Dissertations. No. 1768, pp. 1-90 (Year: 2016).*

(Continued)

*Primary Examiner* — Luu T Pham
*Assistant Examiner* — James J Wilcox

(57) ABSTRACT

A virtual delivery appliance may communicate with a client device over a network to provide the client device with a virtualized session for a user. A processor may be configured to communicate with the client device over the network to perform a registration operation with a relying party. An application within the virtualized session may perform an authentication operation with the relying party to access a resource. The processor may be configured to forward an authentication challenge message to the client device in response to the application receiving the authentication challenge message from the relying party for the user to access the resource, and receive an authentication answer message in response to the authentication challenge message from the client device.

22 Claims, 28 Drawing Sheets

(51) Int. Cl.
  *H04W 12/06* (2021.01)
  *G06F 9/451* (2018.01)
  *H04L 67/02* (2022.01)
  *H04L 67/08* (2022.01)

(52) U.S. Cl.
  CPC .......... *H04L 63/0869* (2013.01); *H04L 63/10* (2013.01); *H04W 12/06* (2013.01); *G06F 9/452* (2018.02); *H04L 67/02* (2013.01); *H04L 67/08* (2013.01)

(56) References Cited

U.S. PATENT DOCUMENTS

| | | | | |
|---|---|---|---|---|
| 7,082,535 | B1* | 7/2006 | Norman | H04W 12/0431 713/168 |
| 7,127,743 | B1* | 10/2006 | Khanolkar | G06F 21/552 709/224 |
| 7,509,687 | B2* | 3/2009 | Ofek | G06F 21/14 709/227 |
| 7,565,535 | B2 | 7/2009 | Roberts et al. | |
| 7,574,737 | B1* | 8/2009 | Loh | H04L 67/04 713/176 |
| 7,814,541 | B1* | 10/2010 | Manvi | H04L 61/2535 726/13 |
| 7,861,077 | B1* | 12/2010 | Gallagher, III | H04L 9/3263 713/168 |
| 7,907,935 | B2* | 3/2011 | Le Saint | G06F 21/31 455/411 |
| 8,549,300 | B1* | 10/2013 | Kumar | H04L 63/0884 713/168 |
| 8,584,209 | B1* | 11/2013 | Borapura | H04L 63/0892 370/254 |
| 8,613,070 | B1* | 12/2013 | Borzycki | H04L 67/104 726/8 |
| 9,154,953 | B2* | 10/2015 | Tofighbakhsh | H04W 12/082 |
| 9,197,693 | B1* | 11/2015 | Pisharody | H04L 63/0272 |
| 9,207,953 | B1* | 12/2015 | Shokhor | H04L 67/288 |
| 9,419,951 | B1* | 8/2016 | Felsher | H04L 9/0841 |
| 9,438,564 | B1* | 9/2016 | Weng | H04L 63/0281 |
| 9,483,627 | B1* | 11/2016 | Ferg | H04L 63/083 |
| 9,516,039 | B1* | 12/2016 | Yen | H04L 63/1425 |
| 9,516,053 | B1* | 12/2016 | Muddu | G06N 20/20 |
| 9,633,322 | B1* | 4/2017 | Burger | G06Q 20/405 |
| 9,686,238 | B1* | 6/2017 | Row, II | H04L 12/06 |
| 9,806,940 | B1* | 10/2017 | Nielsen | H04L 12/4641 |
| 9,923,829 | B1* | 3/2018 | Liu | H04L 67/1029 |
| 9,953,162 | B2* | 4/2018 | Okereke | G06F 21/563 |
| 10,050,963 | B2* | 8/2018 | Kamel | H04L 67/14 |
| 10,068,077 | B2* | 9/2018 | Mucci | H04W 12/065 |
| 10,122,577 | B1* | 11/2018 | Rykowski | H04L 63/166 |
| 10,237,294 | B1* | 3/2019 | Zadeh | H04L 63/1425 |
| 10,255,445 | B1* | 4/2019 | Brinskelle | G06F 21/606 |
| 10,277,578 | B2 | 4/2019 | Innes | |
| 10,289,835 | B1* | 5/2019 | Machani | H04L 9/0894 |
| 10,491,603 | B1* | 11/2019 | Robinson | H04L 63/20 |
| 10,673,880 | B1* | 6/2020 | Pratt | G06F 21/554 |
| 10,762,181 | B2* | 9/2020 | Baghdasaryan | G06Q 20/3274 |
| 10,958,640 | B2* | 3/2021 | Divoux | H04L 63/0876 |
| 10,979,430 | B1* | 4/2021 | Hitchcock | H04L 63/102 |
| 11,184,766 | B1* | 11/2021 | Lord | G06V 10/75 |
| 11,240,242 | B1* | 2/2022 | Celik | H04L 12/4633 |
| 11,496,396 | B1* | 11/2022 | Kunc | H04L 45/74 |
| 11,588,790 | B2* | 2/2023 | Row, II | H04W 48/16 |
| 11,595,312 | B2* | 2/2023 | Savarese | H04L 47/20 |
| 2002/0018456 | A1* | 2/2002 | Kakemizu | H04L 12/4675 370/349 |
| 2002/0162026 | A1* | 10/2002 | Neuman | H04L 63/0227 726/4 |
| 2002/0174344 | A1* | 11/2002 | Ting | H04L 63/1466 713/185 |
| 2003/0120502 | A1* | 6/2003 | Robb | G06Q 30/04 705/34 |
| 2003/0172144 | A1* | 9/2003 | Henry | H04L 63/1458 709/223 |
| 2003/0172145 | A1* | 9/2003 | Nguyen | H04L 12/185 709/223 |
| 2003/0172307 | A1* | 9/2003 | Henry | H04L 61/5014 713/171 |
| 2003/0212926 | A1* | 11/2003 | Bhat | H04L 41/0659 714/43 |
| 2003/0233572 | A1* | 12/2003 | Van Ackere | H04L 63/0272 726/15 |
| 2003/0237004 | A1* | 12/2003 | Okamura | H04L 63/0823 713/176 |
| 2004/0037260 | A1* | 2/2004 | Kakemizu | H04W 8/04 370/400 |
| 2004/0088542 | A1* | 5/2004 | Daude | H04L 63/08 713/153 |
| 2004/0129787 | A1* | 7/2004 | Saito | G06F 21/35 235/492 |
| 2004/0143730 | A1* | 7/2004 | Wen | H04W 12/06 713/150 |
| 2006/0059265 | A1* | 3/2006 | Keronen | H04L 63/0428 709/228 |
| 2006/0059344 | A1* | 3/2006 | Mononen | H04L 9/0891 713/171 |
| 2006/0074618 | A1* | 4/2006 | Miller | G06F 11/3664 703/13 |
| 2006/0184998 | A1* | 8/2006 | Smith | H04L 41/0253 726/3 |
| 2006/0209794 | A1* | 9/2006 | Bae | H04L 61/2514 370/352 |
| 2006/0230445 | A1* | 10/2006 | Huang | H04W 12/041 726/15 |
| 2006/0236095 | A1* | 10/2006 | Smith | H04L 63/0272 713/153 |
| 2007/0002787 | A1* | 1/2007 | Narayanan | H04M 15/00 370/328 |
| 2007/0011733 | A1* | 1/2007 | Gbadegesin | H04L 67/1044 726/11 |
| 2007/0019545 | A1* | 1/2007 | Alt | H04L 63/0428 370/230 |
| 2007/0019622 | A1* | 1/2007 | Alt | H04L 65/1101 370/352 |
| 2007/0019623 | A1* | 1/2007 | Alt | H04L 63/0281 370/352 |
| 2007/0022289 | A1* | 1/2007 | Alt | H04L 9/3271 713/168 |
| 2007/0143827 | A1* | 6/2007 | Nicodemus | H04L 63/102 726/2 |
| 2007/0143851 | A1* | 6/2007 | Nicodemus | H04L 63/1433 726/4 |
| 2007/0186106 | A1* | 8/2007 | Ting | H04L 63/0815 713/168 |
| 2007/0234412 | A1* | 10/2007 | Smith | G06F 21/53 726/11 |
| 2008/0028225 | A1* | 1/2008 | Eckert | H04L 63/0869 713/182 |
| 2008/0144625 | A1* | 6/2008 | Wu | H04L 45/306 370/392 |
| 2009/0067410 | A1* | 3/2009 | Sterman | H04L 63/10 370/352 |
| 2009/0178109 | A1* | 7/2009 | Nice | H04L 63/14 726/1 |
| 2009/0265201 | A1* | 10/2009 | Kim | G06Q 40/06 705/50 |
| 2010/0287270 | A1* | 11/2010 | Hashimoto | H04L 12/66 709/223 |
| 2010/0325719 | A1* | 12/2010 | Etchegoyen | H04L 69/40 726/15 |
| 2011/0137797 | A1* | 6/2011 | Stals | G06Q 20/20 705/44 |
| 2011/0167490 | A1* | 7/2011 | Yung | H04L 47/283 726/22 |
| 2011/0215921 | A1* | 9/2011 | Ben Ayed | G08B 1/08 340/539.11 |
| 2011/0246196 | A1* | 10/2011 | Bhaskaran | G10L 17/24 704/E15.044 |
| 2011/0276699 | A1* | 11/2011 | Pedersen | H04L 47/24 709/227 |

(56) References Cited

U.S. PATENT DOCUMENTS

| | | | |
|---|---|---|---|
| 2011/0277026 A1* | 11/2011 | Agarwal | H04L 63/0815 726/8 |
| 2011/0313922 A1* | 12/2011 | Ben Ayed | H04W 4/80 705/42 |
| 2012/0117611 A1* | 5/2012 | Wookey | G06F 21/10 726/33 |
| 2012/0140993 A1* | 6/2012 | Bruso | G06V 40/40 382/118 |
| 2012/0229499 A1* | 9/2012 | Tsao | G06F 3/14 345/619 |
| 2012/0233668 A1* | 9/2012 | Leafe | G06F 9/44526 726/4 |
| 2012/0272310 A1* | 10/2012 | Souissi | H04L 67/565 726/15 |
| 2013/0074176 A1* | 3/2013 | Nishihata | H04L 63/08 726/15 |
| 2013/0103834 A1* | 4/2013 | Dzerve | H04L 67/10 709/225 |
| 2013/0152169 A1* | 6/2013 | Stuntebeck | H04L 67/51 726/4 |
| 2013/0198741 A1* | 8/2013 | De | G06F 8/71 718/1 |
| 2013/0247144 A1* | 9/2013 | Marshall | H04L 63/10 726/1 |
| 2013/0253979 A1* | 9/2013 | Williams | G06Q 10/0635 705/7.28 |
| 2013/0254394 A1* | 9/2013 | Kong | H04M 15/7652 709/224 |
| 2013/0269003 A1* | 10/2013 | Wentker | G06Q 20/385 726/4 |
| 2013/0305338 A1* | 11/2013 | Casals Andreu | H04L 63/0815 726/8 |
| 2014/0051391 A1* | 2/2014 | Torres | H04W 12/068 455/411 |
| 2014/0094142 A1* | 4/2014 | Torres | H04W 12/068 455/411 |
| 2014/0109194 A1* | 4/2014 | Manton | H04W 12/082 726/4 |
| 2014/0237585 A1* | 8/2014 | Khan | H04L 63/0272 726/15 |
| 2014/0259109 A1* | 9/2014 | Houston | H04L 63/08 726/3 |
| 2014/0259115 A1* | 9/2014 | Bakshi | H04L 63/08 726/4 |
| 2014/0282846 A1* | 9/2014 | DeWeese | H04L 63/0823 726/4 |
| 2014/0282869 A1* | 9/2014 | Dabbiere | G06F 21/54 726/3 |
| 2014/0282894 A1* | 9/2014 | Manton | H04L 63/102 726/4 |
| 2014/0282895 A1* | 9/2014 | Stuntebeck | H04L 63/0853 726/4 |
| 2014/0282897 A1* | 9/2014 | Stuntebeck | G06F 21/10 726/4 |
| 2014/0289833 A1* | 9/2014 | Briceno | H04L 9/006 726/5 |
| 2014/0317682 A1* | 10/2014 | Erickson | H04L 63/20 726/1 |
| 2014/0331297 A1* | 11/2014 | Innes | H04L 63/0823 726/7 |
| 2014/0348158 A1* | 11/2014 | Han | H04L 65/1069 370/352 |
| 2015/0039768 A1* | 2/2015 | Matczynski | H04L 47/781 709/226 |
| 2015/0121496 A1* | 4/2015 | Caldeira De Andrada | H04L 63/08 726/7 |
| 2015/0143454 A1* | 5/2015 | Lee | H04L 63/0272 726/1 |
| 2015/0143504 A1* | 5/2015 | Desai | H04L 63/0245 709/224 |
| 2015/0244706 A1* | 8/2015 | Grajek | H04L 63/0815 726/6 |
| 2015/0288719 A1* | 10/2015 | Freudiger | H04L 63/0272 726/12 |
| 2015/0358281 A1* | 12/2015 | Chen | H04L 63/029 726/12 |
| 2015/0372982 A1* | 12/2015 | Herle | H04L 63/0272 726/15 |
| 2015/0381621 A1* | 12/2015 | Innes | H04W 12/069 726/7 |
| 2016/0087941 A1* | 3/2016 | Mudigonda | H04L 12/4641 726/12 |
| 2016/0094543 A1* | 3/2016 | Innes | H04L 63/0823 726/6 |
| 2016/0094546 A1* | 3/2016 | Innes | G06F 21/33 713/156 |
| 2016/0134599 A1* | 5/2016 | Ross | H04L 63/0815 726/8 |
| 2016/0142375 A1* | 5/2016 | Tubi | H04L 63/0884 726/4 |
| 2016/0197909 A1* | 7/2016 | Innes | H04W 12/06 726/6 |
| 2016/0261564 A1* | 9/2016 | Foxhoven | H04L 63/0272 |
| 2016/0292694 A1* | 10/2016 | Goldschlag | H04L 63/20 |
| 2016/0294822 A1* | 10/2016 | George | H04L 63/0861 |
| 2016/0323249 A1* | 11/2016 | Duncker | G06F 16/2379 |
| 2016/0344736 A1* | 11/2016 | Khait | H04L 63/102 |
| 2017/0034168 A1* | 2/2017 | Wilson | H04L 63/0807 |
| 2017/0109190 A1* | 4/2017 | Sha | G06F 9/45558 |
| 2017/0134370 A1* | 5/2017 | Mavrogiannopoulos | H04L 63/0815 |
| 2017/0236079 A1* | 8/2017 | Venna | G06F 16/2428 705/4 |
| 2017/0279803 A1* | 9/2017 | Desai | H04L 67/02 |
| 2017/0293987 A1* | 10/2017 | Chan | H04L 9/3247 |
| 2017/0331859 A1* | 11/2017 | Bansal | H04L 63/029 |
| 2017/0332238 A1* | 11/2017 | Bansal | H04L 67/125 |
| 2017/0346811 A1* | 11/2017 | Newell | H04L 9/14 |
| 2017/0346812 A1* | 11/2017 | Newell | H04L 63/166 |
| 2017/0346856 A1* | 11/2017 | Newell | H04L 63/20 |
| 2017/0353496 A1* | 12/2017 | Pai | H04L 63/20 |
| 2017/0359344 A1* | 12/2017 | Kaal | H04L 63/0892 |
| 2018/0014340 A1* | 1/2018 | Hill | H04L 12/4679 |
| 2018/0025148 A1* | 1/2018 | Jain | H04L 9/3215 713/166 |
| 2018/0060572 A1 | 3/2018 | Singleton et al. | |
| 2018/0101850 A1* | 4/2018 | Pisut, IV | G06Q 20/367 |
| 2018/0191695 A1* | 7/2018 | Lindemann | H04L 63/0853 |
| 2018/0198786 A1* | 7/2018 | Shah | H04W 12/069 |
| 2018/0212930 A1* | 7/2018 | Cammisa | H04L 63/0281 |
| 2018/0219888 A1* | 8/2018 | Apostolopoulos | H04L 63/1425 |
| 2018/0219891 A1* | 8/2018 | Jain | H04L 63/1425 |
| 2018/0254909 A1 | 9/2018 | Hancock | |
| 2018/0262484 A1* | 9/2018 | Kesari | H04L 51/42 |
| 2018/0270201 A1* | 9/2018 | Chanak | H04L 67/1021 |
| 2018/0285560 A1* | 10/2018 | Negi | G06F 21/72 |
| 2018/0295137 A1* | 10/2018 | Zager | H04L 63/0861 |
| 2018/0351987 A1* | 12/2018 | Patel | G06F 21/577 |
| 2018/0359244 A1* | 12/2018 | Cockerill | H04L 63/0823 |
| 2019/0075099 A1 | 3/2019 | Brouchier et al. | |
| 2019/0075168 A1* | 3/2019 | Goldfarb | H04L 63/0272 |
| 2019/0158503 A1* | 5/2019 | Bansal | H04L 67/535 |
| 2019/0281588 A1* | 9/2019 | Zhang | H04B 7/0617 |
| 2019/0319948 A1* | 10/2019 | Triola | H04L 9/3218 |
| 2019/0333062 A1* | 10/2019 | Gallagher, III | H04L 9/3213 |
| 2019/0394204 A1* | 12/2019 | Bansal | H04L 63/102 |
| 2020/0076850 A1* | 3/2020 | Edgar | H04L 63/1491 |
| 2020/0077265 A1* | 3/2020 | Singh | H04L 63/0272 |
| 2020/0145385 A1* | 5/2020 | Chauhan | H04L 63/0281 |
| 2020/0162517 A1* | 5/2020 | Wong | H04W 12/12 |
| 2020/0204551 A1* | 6/2020 | Singh | H04L 63/0218 |
| 2020/0228557 A1* | 7/2020 | Lin | G06N 5/047 |
| 2020/0242105 A1* | 7/2020 | Rich | H04L 67/1097 |
| 2020/0252213 A1* | 8/2020 | Vijayan | H04L 9/30 |
| 2020/0259831 A1* | 8/2020 | Pampati | H04L 63/0281 |
| 2020/0285752 A1* | 9/2020 | Wyatt | G06F 21/53 |
| 2020/0285761 A1* | 9/2020 | Buck | G06F 21/604 |

(56) References Cited

U.S. PATENT DOCUMENTS

| | | | |
|---|---|---|---|
| 2020/0287793 A1* | 9/2020 | Buck | H04L 41/0806 |
| 2020/0287910 A1* | 9/2020 | Zerrad | H04L 63/102 |
| 2020/0296122 A1* | 9/2020 | Cohen-Sason | H04L 63/1408 |
| 2020/0304503 A1* | 9/2020 | Zerrad | H04W 12/67 |
| 2020/0336484 A1* | 10/2020 | Mahajan | H04L 63/0884 |
| 2020/0342086 A1* | 10/2020 | Oung | G06F 1/163 |
| 2020/0358822 A1* | 11/2020 | Erickson | H04L 63/0823 |
| 2020/0371829 A1* | 11/2020 | Momchilov | G06F 9/5072 |
| 2020/0404069 A1* | 12/2020 | Li | H04W 8/24 |
| 2021/0019400 A1* | 1/2021 | Elgressy | G06F 9/5072 |
| 2021/0029119 A1* | 1/2021 | Raman | H04L 67/1001 |
| 2021/0044569 A1* | 2/2021 | Xu | H04L 67/564 |
| 2021/0105275 A1* | 4/2021 | Bansal | H04L 67/1001 |
| 2021/0136041 A1* | 5/2021 | Foxhoven | H04L 63/029 |
| 2021/0168142 A1* | 6/2021 | Foxhoven | H04L 63/0884 |
| 2021/0234860 A1* | 7/2021 | Bansal | H04W 12/37 |
| 2021/0243782 A1* | 8/2021 | Miao | H04L 5/0091 |
| 2021/0250333 A1* | 8/2021 | Negrea | G06F 9/547 |
| 2021/0314301 A1* | 10/2021 | Chanak | H04L 63/0823 |
| 2021/0320871 A1* | 10/2021 | Savarese | H04L 47/20 |
| 2021/0336932 A1* | 10/2021 | Chanak | H04L 9/0894 |
| 2021/0336933 A1* | 10/2021 | Shah | H04L 67/01 |
| 2021/0336934 A1* | 10/2021 | Deshmukh | H04L 63/105 |
| 2021/0336959 A1* | 10/2021 | Shah | H04L 67/563 |
| 2021/0367944 A1* | 11/2021 | Gupta | H04L 67/56 |
| 2021/0377210 A1* | 12/2021 | Singh | G06F 21/73 |
| 2021/0377223 A1* | 12/2021 | Chanak | H04L 67/01 |
| 2021/0392492 A1* | 12/2021 | Napper | H04L 63/0884 |
| 2022/0029965 A1* | 1/2022 | Chanak | H04L 12/4641 |
| 2022/0053401 A1* | 2/2022 | Foti | H04W 36/0022 |
| 2022/0210130 A1* | 6/2022 | Kaciulis | H04L 69/14 |
| 2022/0329585 A1* | 10/2022 | Chhabra | H04L 63/0861 |
| 2022/0353244 A1* | 11/2022 | Kahn | H04L 63/0823 |
| 2022/0407878 A1* | 12/2022 | Harris | G06N 5/04 |
| 2023/0015603 A1* | 1/2023 | Smith | H04L 63/20 |
| 2023/0019448 A1* | 1/2023 | Deshmukh | H04L 63/1416 |

OTHER PUBLICATIONS

Liao et al "A Novel Multi-Server Remote User Authentication Scheme Using Self-Certified Public Keys for Mobile Clients," pp. 886-900 (Year: 2013).*

Ruiu et al "Accessing Cloud Services Through Biometrics Authentication," 2016 10th International Conference on Complex, Intelligent, and Software Intensive Systems, pp. 38-43 (Year: 2016).*

Garg et al "Design of Secure Authentication Protocol in SOCKS V5 for VPN using Mobile Phone," pp. 1-6 (Year: 2015).*

Catuogno et al "Flexible and Robust Enterprise Right Management," 2016 IEEE Symposium on Computers and Communication (ISCC), pp. 1-6 (Year: 2016).*

Shah et al "Multi-Factor Authentication as a Service," 2015 3rd IEEE International Conference on Mobile Cloud Computing, Services and Engineering, IEEE Computer Society, pp. 144-150 (Year: 2015).*

Pascual et al "On the Use of Mobile Phones and Biometrics for Accessing Restricted Web Services," IEEE Transactions on Systems, Man and Cybernetics-Part C: Applications and Reviews, vol. 42, No. 2, Mar. 2012, pp. 213-222 (Year: 2012).*

* cited by examiner

VIRTUAL DELIVERY APPLIANCE AND SYSTEM WITH REMOTE AUTHENTICATION AND RELATED METHODS

RELATED APPLICATIONS

This application claims the benefit of U.S. provisional application Ser. No. 62/850,099 filed May 20, 2019, which is hereby incorporated herein in its entirety by reference.

TECHNICAL FIELD

The present disclosure relates to desktop virtualization, and more particularly, to virtualized authentication.

BACKGROUND

Many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment, or cloud system, in which a pool of computing resources (e.g., desktop virtualization servers), storage disks, networking hardware, and other physical resources may be used to provision virtual desktops, and/or provide access to shared applications.

SUMMARY

A virtual delivery appliance may include a memory and a processor configured to cooperate with the memory to communicate with a client device over a network to provide the client device with a virtualized session for a user. The processor may be configured to communicate with the client device over the network to perform a registration operation with a relying party. An application within the virtualized session may perform an authentication operation with the relying party to access a resource. The processor may be configured to forward an authentication challenge message to the client device in response to the application receiving the authentication challenge message from the relying party for the user to access the resource, and receive an authentication answer message in response to the authentication challenge message from the client device. The authentication answer message may be based upon a biometric characteristic of the user accessible from a memory of the client device. The application may forward the authentication answer message to the relying party to complete the authentication operation.

In some embodiments, the client device may comprise a biometric device configured to generate the biometric characteristic of the user. In other embodiments, the client device may comprise a local wireless transceiver configured to exchange the authentication challenge message and the authentication answer message with a mobile wireless communication device.

Also, the client device and the virtualized session may be configured to operate a virtual channel therebetween for wrapping the authentication challenge message and the authentication answer message within a channel protocol. For example, the application may comprise a web browser application.

The processor may be configured to receive a web authentication application programming interface (API) command from the relying party. The processor may be configured to translate the web authentication API command from the relying party into the authentication challenge message. The client device may be configured to generate the web authentication API command based upon the authentication challenge message.

The web authentication API command may comprise a WebAuthn standard authentication command. The virtual delivery appliance wherein the application operates within a virtual operating system (OS), and the virtual OS may comprise a native authentication interface. The processor may be configured to intercept an authentication OS command of the native authentication interface from the relying party. The processor may be configured to translate the authentication OS command from the relying party into the authentication challenge message, and the client device may be configured to reconstruct the authentication OS command based upon the authentication challenge message.

Another aspect is directed to a computing system comprising a client device, and a virtual delivery appliance configured to communicate with the client device over a network to provide the client device with a virtualized session for a user. The virtual delivery appliance may be configured to communicate with the client device over the network to perform a registration operation with a relying party. An application within the virtualized session may perform an authentication operation with the relying party to access a resource. The virtual delivery appliance may be configured to forward an authentication challenge message to the client device in response to the application receiving the authentication challenge message from the relying party for the user to access the resource, and receive an authentication answer message in response to the authentication challenge message from the client device. The authentication answer message may be based upon a biometric characteristic of the user accessible from a memory of the client device, and the application may forward the authentication answer message to the relying party to complete the authentication operation.

A method is for operating a virtual delivery appliance. The method may include communicating with a client device over a network to provide the client device with a virtualized session for a user, and communicating with the client device over the network to perform a registration operation with a relying party. An application within the virtualized session may perform an authentication operation with the relying party to access a resource. The method may include forwarding an authentication challenge message to the client device in response to the application receiving the authentication challenge message from the relying party for the user to access the resource, and receiving an authentication answer message in response to the authentication challenge message from the client device. The authentication answer message may be based upon a biometric characteristic of the user accessible from a memory of the client device, and the application may forward the authentication answer message to the relying party to complete the authentication operation.

DETAILED DESCRIPTION

Figure 1:
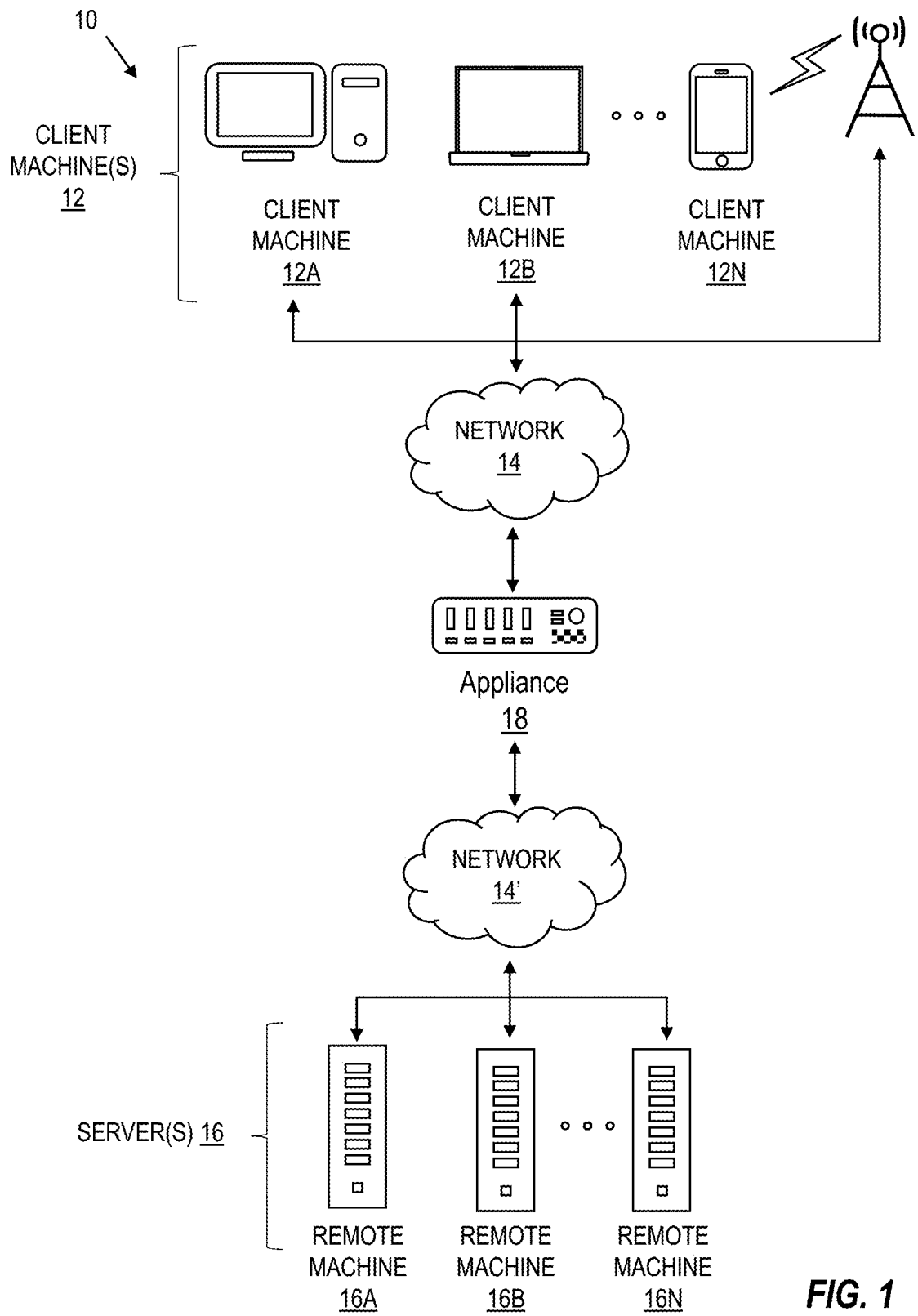
FIG. 1 is a schematic block diagram of a network environment of computing devices in which various aspects of the disclosure may be implemented.

Because of the generic hardware nature of hosted hardware, the ability to use biometric authentication services in hosted browsers and native applications is not available in typical approaches. In particular, a virtual Trusted Platform Module (TPM) device-based solution may not be a feasible option because the physical TPM has a Rivest-Shamir-Adleman (RSA) key burned into the chip which validates the platform on which it is embedded.

There is a global security problem with the use of passwords as a form of authentication. They are not secure, are becoming less convenient for an end user, present privacy concerns and at the enterprise level, an effective password policy is not scalable. In particular, the conventional authentication system is predominantly password based and suffers from major drawbacks in two aspects: security and convenience. Security: On the endpoint, the passwords are subject to phishing attacks. At the host, there is a design question of securely storing the hashed passwords—either in the hosted environment or leveraging the cloud storage, both of which are susceptible to stealing attacks. Convenience: Remembering passwords for different accounts becomes challenging to the user as account increase. To alleviate this, the user may choose to save them securely in the credential manager of the endpoint (client device) platform. If the endpoint fails to retrieve the saved passwords securely it will result in the execution of additional methods to identify the user and create a new password. Additionally, it is recommended that the password is changed at regular intervals. The foregoing contribute to the inconvenience aspect of the password based authentication system and its management at the endpoint devices.

FIDO2 provides a user authentication framework that can replace passwords and will achieve it without compromising user convenience and experiences across difference types of devices and clients. This framework replaces password with FIDO2 credentials that can't be phished, replayed, and are not subject to server breach attacks. Users can conveniently use gestures, such as the use of PINs or biometrics to authorize use of FIDO2 credentials. FIDO2 is the overarching term for FIDO Alliance's newest set of specifications. FIDO2 enables users to leverage common devices to easily authenticate to online services in both mobile and desktop environments.

From a security perspective, FIDO2's cryptographic login credentials are unique across every website, never leave the user's device and are never stored on a server. This security model helps eliminate the risks of phishing, as well as forms of password theft and replay attacks.

Using biometrics helps address the end-user convenience and privacy concerns. Users unlock cryptographic login credentials with built-in methods, such as fingerprint readers or cameras on their devices, or by leveraging easy-to-use FIDO security keys. Because FIDO cryptographic keys are unique for each internet site, they cannot be used to track users across sites. Plus, biometric data, when used, never leaves the user's device. Finally, with respect to scalability, websites can enable FIDO2 through a simple JavaScript (JS) API call that is supported across leading browsers and platforms on billions of devices consumers use every day.

FIDO2 requires three components to function. An authenticator, a Client to Authenticator Protocol (CTAP) and a biometric device. On a modern laptop, these components are addressed with the TPM 2.0 module (authenticator), Windows Hello (CTAP), and an integrated IR camera or fingerprint scanner (biometric device). All these components are needed to authenticate to a website that has WebAuthn enabled.

In the virtual world, e.g., on a Windows 10 virtual desktop, none of those components exist. There is no TPM 2.0 module, no integrated biometric devices and subsequently no Windows Hello. The present approach addresses these technical problems by leveraging local endpoint device components to do FIDO2 authentication in a virtual desktop. Thus, the need for passwords in a virtual session is alleviated. The convenience factor gets a boost from the fact that a biometric identifier (fingerprint, face recognition, etc.) is used to identify the user, obviating any need for memorization and password reset.

It should be noted that a direct application of FIDO2 in a hosted (virtual environment) is not possible because either physical TPMs do not exist, as described above, or even when a physical TPM exists there is no persistence between different user sessions in common cases such as a remote desktop session host (RDSH, Terminal Server/multi-user environment), pooled desktops, or Citrix Secure Browser service, where different physical hardware (and therefore different TPM instances) may be combined with persistent OS instance, identity disks and user layers for each new user session with a VDA.

The example approaches set forth herein create a secure framework for passwordless authentication to hosted apps and desktops. In particular, this disclosure relates to a biometric authentication framework that leverages the crypto-processor (e.g. a TPM 2.0) at a client device (desktop computing device, mobile device, or a trusted multi-hop with Citrix Workspace App (CWA)) to provide biometric authentication services to hosted browsers and native applications. More specifically, the disclosure provides an approach with techniques for securely and robustly redirecting authentication flows and leveraging endpoint device capabilities. The biometric keys required for completing the authentication operations are securely locked in the crypto-processor and the hosted applications and desktops obtain their services through a secure pipeline. When a desktop device does not have FIDO2 capabilities, a FIDO2-capable mobile device securely paired to the desktop device can be used to fulfill the authentication operations. Furthermore, to achieve security, resiliency and high performance, the authenticated credential IDs may be stored on all or a subset of the hosted desktop, the endpoint device and the mobile device. An advantage of the present approach is that it enables FIDO2 in a virtual session.

In particular, this disclosure provides remoting of authentication hardware from the client device and associated mobile devices (redirection of crypto-processor) to the hosted hardware. For the user, this provides FIDO2-based (password-less) biometric authentication services to remotely hosted browsers and native applications. As such, the systems and methods set forth herein advantageously provide improved performance within a virtualized and/or enterprise computing environment.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; an HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
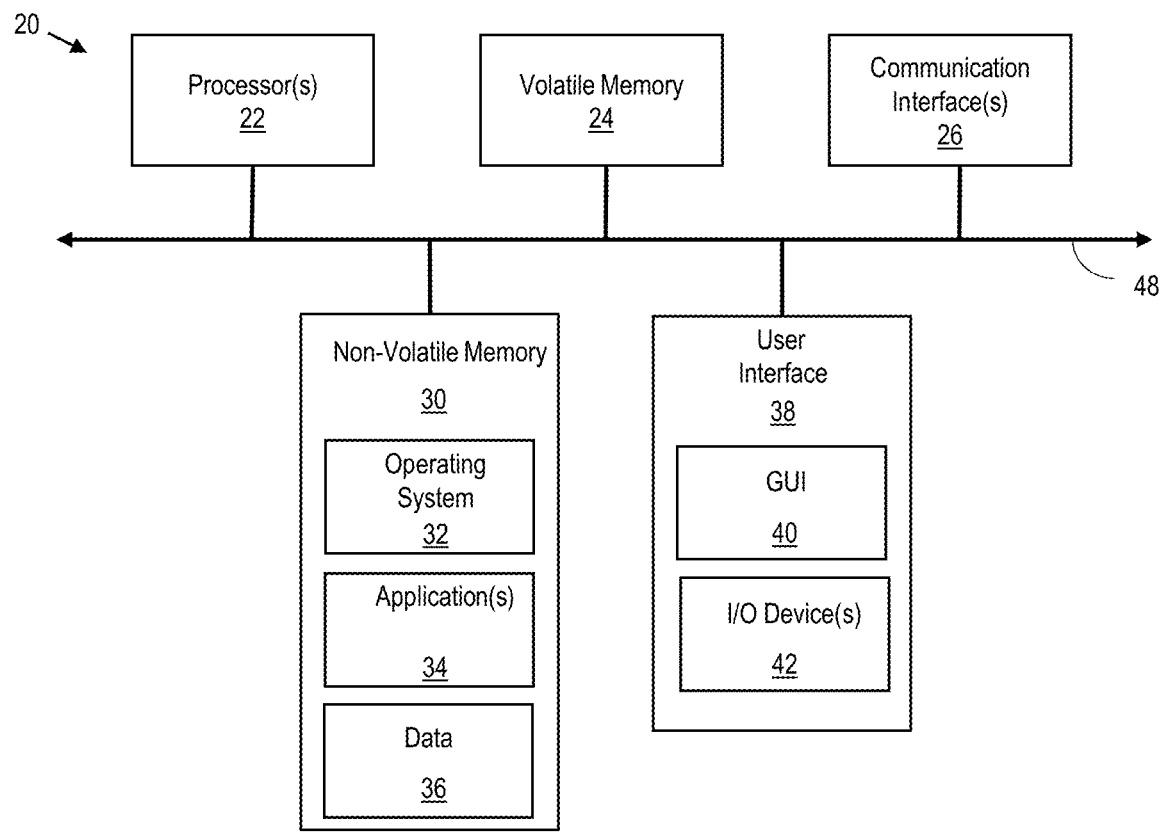
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
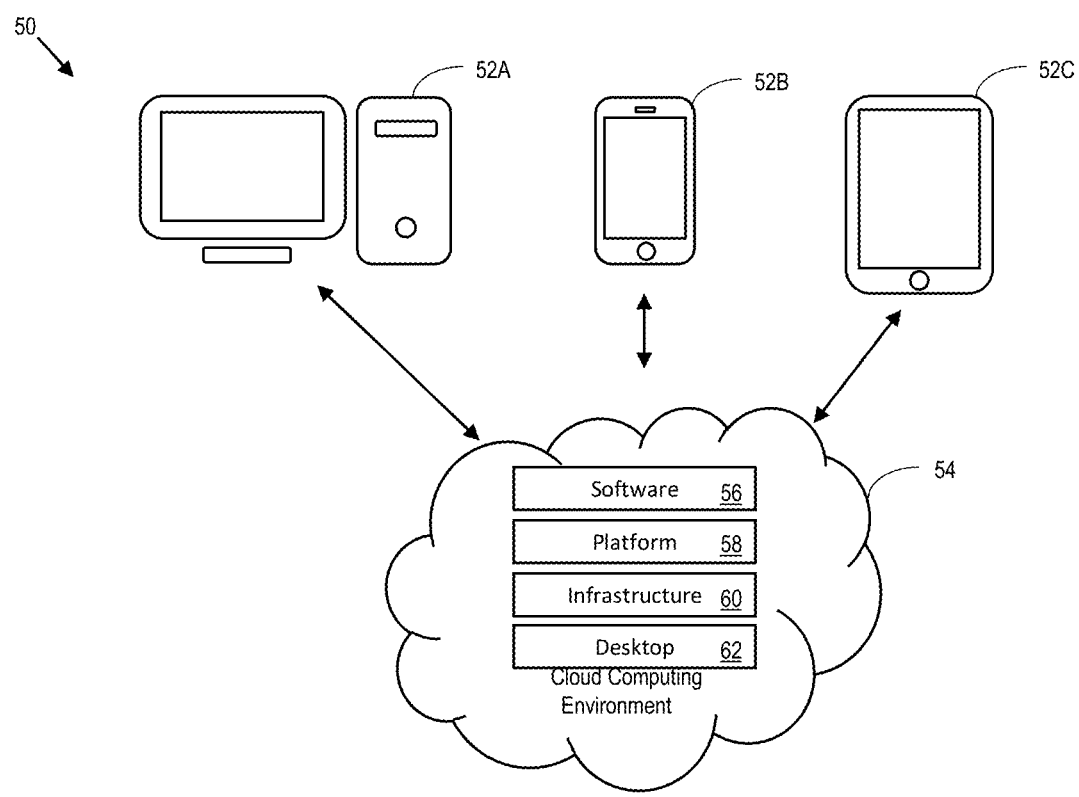
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
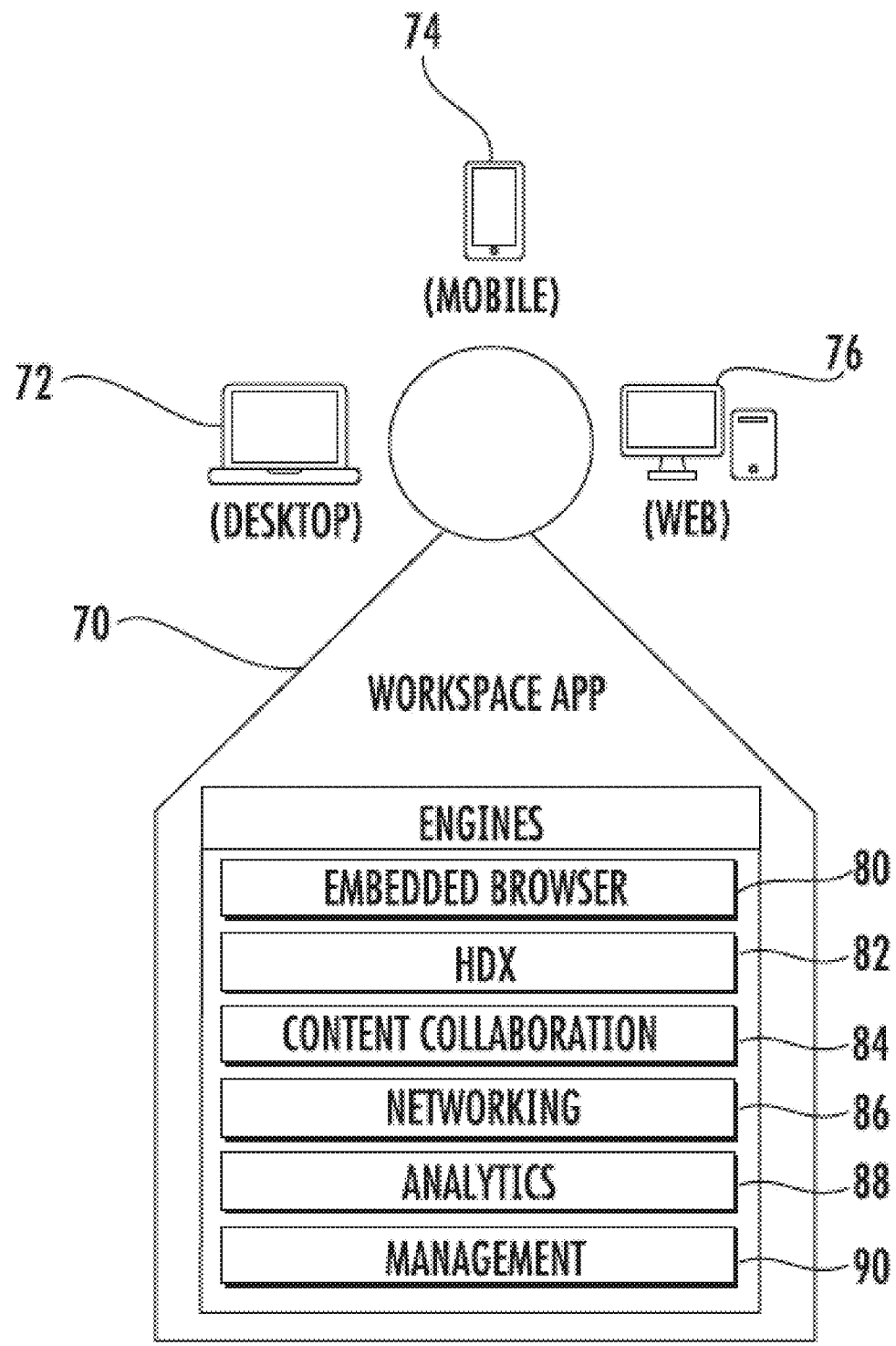
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

An Citrix High Definition User Experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
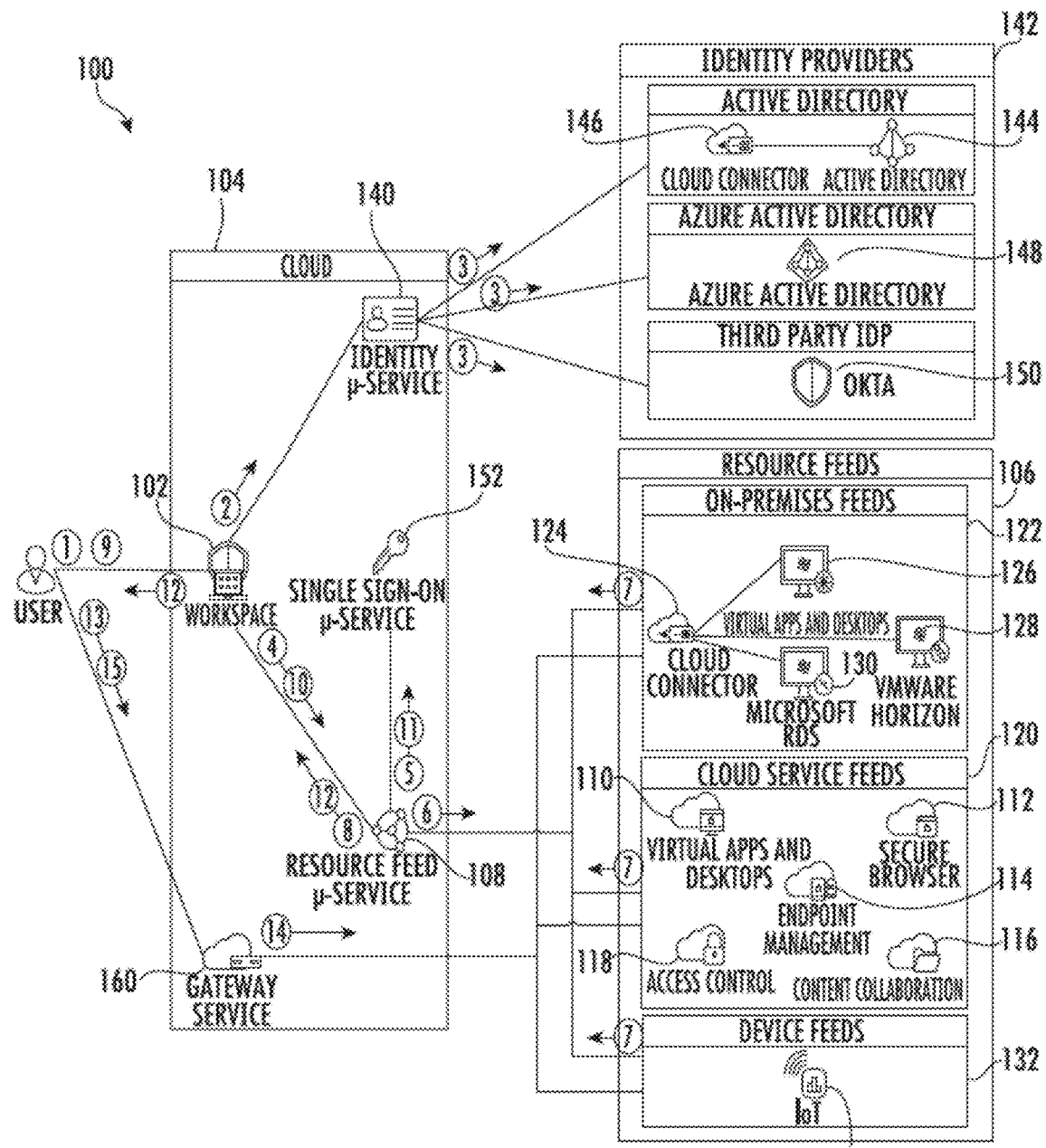
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

This disclosure relates to a biometric authentication framework that leverages the crypto-processor (e.g. a TPM 2.0) at a client device (desktop, mobile, or trusted multi-hop with CWA) to provide biometric authentication services to hosted browsers and native applications.

Providing FIDO2-based (passwordless) biometric authentication services to remotely hosted browsers and native applications is further discussed in this disclosure. This framework leverages the crypto-processor at the client endpoint to biometrically lock the cryptographic keys used for authentication.

The approach uses techniques for securely and robustly redirecting authentication flows and leveraging endpoint device capabilities. The biometric keys required for completing the authentication operations are securely locked in the crypto-processor and the hosted apps and desktops obtain their services through a secure pipeline. In contrast, unlike the crypto-processor, a Hardware Security Module (HSM) is on a network bus and is therefore not a suitable solution. The present approach provides platform authenticators through crypto-processor. When a desktop device does not have FIDO2 capabilities, a FIDO2-capable mobile device, securely paired to the desktop device, can be used to fulfill the authentication operations. Furthermore, to achieve security, resiliency and high performance, the authenticated credential IDs may be stored on all or a subset of the hosted desktop, the endpoint device and the mobile device.

The example approaches set forth herein create a secure framework for passwordless authentication to hosted apps and desktops. To do so, it leverages the biometric authentication techniques (e.g., TPM) in the endpoint to help ensure the private/secret key never leaves the crypto-processor.

Figure 6:
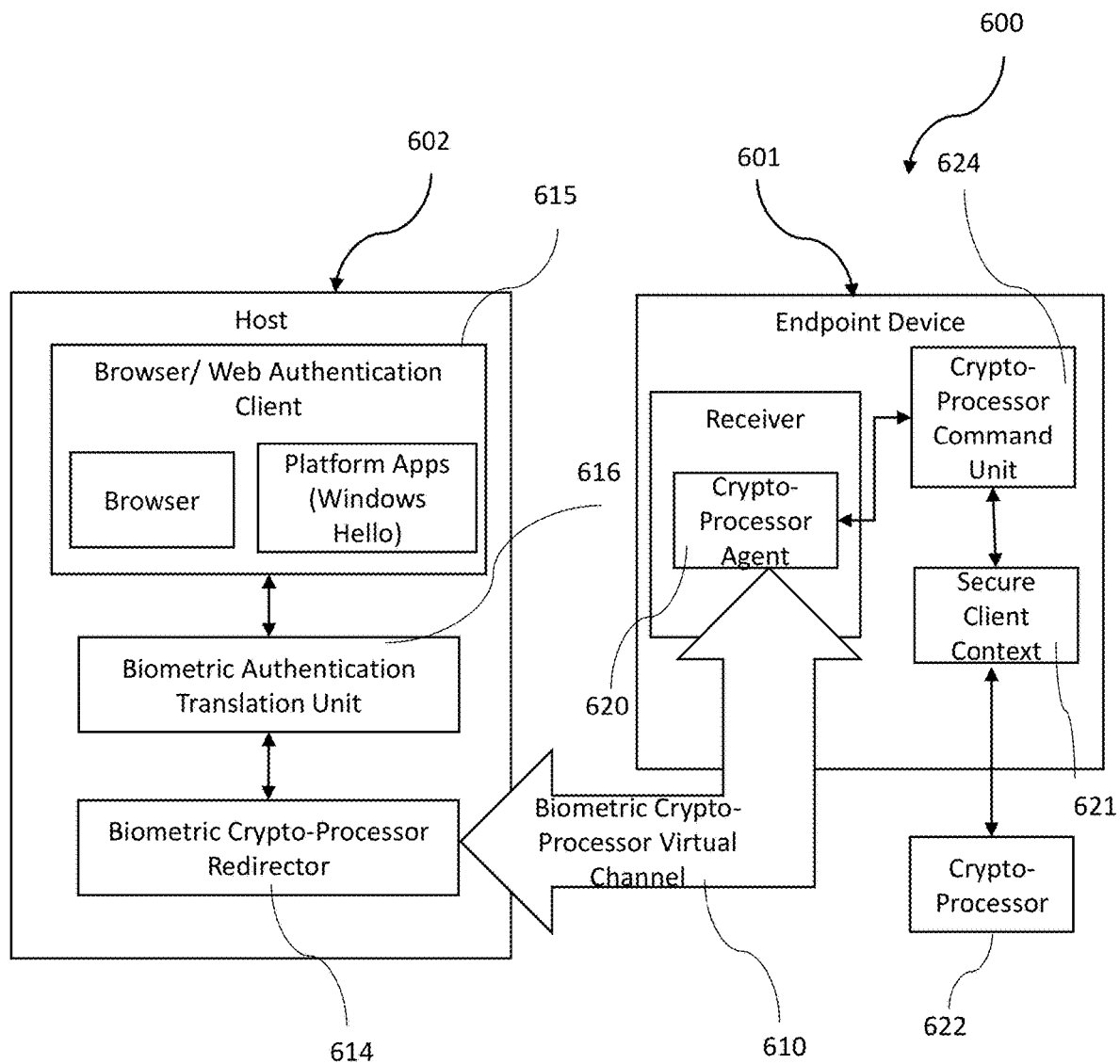
FIG. 6 is a schematic block diagram of a computing system implementing FIDO2 (Fast IDentity Online) biometric redirection in accordance with a first example embodiment.

In the following, components and flows of the disclosure are discussed. In some examples, the proposed approach leverages a crypto-processor (e.g. a TPM 2.0) for cryptographic services to provide passwordless authentication framework to the hosted browsers and native apps as illustrated in FIG. 6. This approach is accomplished by the creation of the following components.

Firstly, a biometric authentication translation unit includes a translation engine in the host that converts the web authentication requests originating from FIDO2 relying party server into messages that can be reconstructed, translated, or otherwise interpreted at the remote endpoint for issuing commands to the crypto-processor. Additionally, the translation unit is also responsible to deliver the results of the crypto-processor operations to the hosted browser FIDO2 client.

Secondly, a JS/WebAuthn interception module is for intercepting JS or Authenticator (WebAuthn) APIs corresponding to FIDO2 authentication operations within the hosted browser and redirecting them to a relay module in the virtual session, which further redirects the authentication operations to an application on the endpoint device (e.g., Citrix Workspace App (CWA) over an HDX virtual channel). For more details, refer to section API interception techniques further below.

Thirdly, a crypto-processor (e.g. a HDX biometric TPM 2.0) or WebAuthn virtual channel is a presentation layer communication pipe between the remote host and the endpoint transporting biometric/WebAuthn operation requests and responses wrapped in the channel protocol.

Fourthly, a crypto-processor/WebAuthn command processor is running in a native application on the endpoint (e.g., CWA). It has at least three chief goals. The first is to create a client context at the endpoint that enables a secure communication to the authenticator. The second is to unmarshall or otherwise transform the authentication requests protocol messages to the corresponding platform data structures. The last one is to send the appropriate commands to the authenticator (crypto-processor) in the endpoint. This is achieved by issuing the corresponding WebAuthn operations upon the request messages received by the host and returning the response messages.

The flow of the biometric redirection framework is as follows: as illustrated in the computing system 600 of FIG. 6, a published browser 615 in the datacenter 602 (virtual session) also plays the role of a web authentication client. It interacts with a FIDO2 relying party server using the standard web authentication APIs (WebAuthn). The biometric authentication translation unit 616 is loaded by the JS/WebAuthn interception module and employs the translation engine that marshals or otherwise transforms the input for authentication operations to be executed by the remote crypto-processor (e.g. a TPM) into a biometric crypto-processor request command. The translation unit is also responsible for un-marshalling the biometric crypto-processor redirector response commands and passing them to the web authentication client (the hosted browser). The JS/WebAuthn interception module, biometric crypto-processor redirector 614 in the hosted virtual session and the crypto-processor agent 620 at the endpoint device 601 are the components that support a secure biometric crypto-processor virtual channel 610 transmit and receive crypto-processor request and response commands. The role of the crypto-processor agent 620 is the stack management of the presentation protocol (e.g., Citrix HDX or Independent Computing Architecture (ICA)) which includes setup, tear down and state machine maintenance of the virtual channel protocol. In practice, agent 620 may be implemented as a virtual driver, e.g. a DLL hosted by an engine sub-component of CWA.

The command processor 624 prepares the authentication operation commands and establishes a secure browser context to enable cryptographic operations with for example, crypto-processor 622, such as a TPM. Crypto-processor command unit commands include key generation and requests to digitally sign a payload from previously generated keys that aid in the authentication process. The secure client context 621 executes the commands prepared by the crypto-processor command processors 624 and returns the results of the crypto-processor operations to the command unit.

The crypto-processor command unit 624 builds a biometric response command and relayed it back to the host. At the host, the biometric redirector 614 then passes the response command to the web authentication client (the hosted browser) that initiated the request on behalf of the application.

In the following, JS API interception techniques are discussed. JS APIs are available to HTML 5/JS applications within a web browser or within an application development platform, such as Electron, which combines an HTML 5/JS application engine with additional desktop-specific platform functionality. Interception of JS APIs by a desktop virtualization platform requires additional techniques, as described further below.

In the following, hooking techniques are discussed. In some implementations, JS rendering DLL APIs could be hooked to insert custom JS. For example, in browsers, such as Internet Explorer (IE), the JS engine DLL is jscript.dll and is a (in process) COM object server. Hence the approach would be to employ standard COM shimming techniques to operate as a "man in the middle" (MITM) in order to insert custom JS. In the IE JS engine, all JS objects implement the IDispatchEx interface. Alternatively, a different approach would be to hook OS socket APIs, e.g. WinSock APIs, parse HTTP traffic and HTML content and then insert JS.

In the following, a custom browser is discussed. A custom Chromium-based browser engine and custom secure browser, e.g., as part of the Citrix secure browser cloud service, is described below. Also, the disclosure further describes the use of hooks or plugins within the Chromium engine to inject custom JS. Alternatively, a custom browser engine may implement some or all of the JS API redirection functionality in native code, limiting or removing the need to inject custom JS code.

In the following, JS injection via proxy techniques is discussed, for example, use of a proxy to intercept HTML content is described below. The proxy would add additional JS via content rewriting. The proxy could be a separate appliance on the network, or reside on the virtual desktop. The proxy could be configured explicitly (using browser settings) or operate as a transparent proxy.

In the following, JS injection via Browser Helper Object (BHO) or Browser Extension (BE) techniques is discussed. JS code to implement JS API redirection could be injected into a browser-based application using a browser helper object or a browser extension for web browsers that implement BHO or browser extension mechanisms.

In the following, JS injection via micro-VPN plugin techniques is discussed, for example, use of a Universal Windows Platform (UWP) App to implement a Virtual Private Network (VPN) app plugin. The UWP VPN Plugin app could handle the declaration of the VPN client plug-in capability in the AppX manifest and provide reference to the VPN plug-in app handler. Running the plugin within a sandbox (or application container) allows for greater security and reduced complexity of the implementation.

The VPN app plugin is able to control VPN connections in conjunction with the OS VPN platform. In addition, the VPN app plugin could be configured as a micro-VPN, e.g., it can be applied on a per-application basis. For example, the configuration could be achieved via Mobile Device Management (MDM) or Mobile Application Management (MAM) policies. Alternatively, a custom profile may be created using PowerShell scripts. The configuration could specify applications whose traffic is to be managed by the micro-VPN plugin. In particular, the micro-VPN plugin could be configured for browser applications and Electron based apps. The micro-VPN plugin could be enabled to intercept network traffic for all or specific applications, decrypt TLS using local certificate store, parse HTTP traffic and HTML content and then insert custom JS.

In the following, electron app decomposition is discussed. For electron application decomposition, the electron application is detected and modified by decomposing binaries of the electron application to access the APIs of a real-time media application. Application content is usually located within an .asar archive located within a subfolder corresponding to the electron application. In some embodiments, this archive may be unpacked using asar.exe (available as a node.js package) to access the JS code for the application. Then hooks are added to inject the redirection code into the real-time media application based on the intercepted APIs. Then the electron application binaries are repackaged and, finally, the electron application binaries are resigned. The modified electron application is thus configured to intercept the APIs of the real-time media application based on hooking, and inject the redirection code into the real-time media application based on the intercepted APIs. Stated another way, the electron application is detected during virtual application publishing.

In the following, additional interception techniques are discussed. Browsers and native applications use WebAuthn.DLL for communicating to Windows Hello and external security keys following the WebAuthn and CTAP specifications. Using API hooking techniques, the native WebAuthn DLL could be intercepted and hooked at the host (e.g., a VDA). For example, a Hook DLL implements the WebAuthn interception module, which mirrors the original WebAuthn DLL. This module is responsible for processing the application's authentication requests by marshaling or otherwise transforming them into a platform-independent protocol. The WebAuthn interception module communicates with the authenticator redirector providing a secure context for sending the request to the client authenticator agent. The WebAuthn interception module is also responsible for processing the responses received from the client authenticator agent and converting them into the corresponding native authentication responses that the application is expecting.

There are many benefits of using this redirection technique. For instance, the hook DLL gets dynamically loaded at runtime when the client application decides to use the authenticator APIs. There is no need for recompilation, repackaging or installing custom extensions into the client applications. This approach provides advantages over the previously described JS API interception techniques.

In the following, policy enforcement techniques are discussed. Administrators can setup policies to control various aspects of the registration and authentication process. The WebAuthn interception module has the ability to inspect the Registration/Authentication requests and enforce the proper administrator policies. For example, an administrator can blacklist certain websites, or require certain types of authenticators, attestation types, transports, etc.

In the following, an example list of WebAuthn intercepted APIs is discussed. Table 1 below provides a list of the WebAuthn intercepted APIs along with a brief description.

TABLE 1

| WebAuthn API Intercepted | Description |
| --- | --- |
| WebAuthNGetApiVersionNumber | Queries the Native WebAuthn API Supported version |
| WebAuthNIsUserVerifyingPlatformAuthenticatorAvailable | Checks if platform authenticator is available (e.g. TPM) |
| WebAuthNAuthenticatorMakeCredential | Initiates Registration (credential creation) |
| WebAuthNAuthenticatorGetAssertion | Initiates Authentication (credential assertion) |
| WebAuthNFreeCredentialAttestation | Frees the memory allocated for credential attestation |
| WebAuthNFreeAssertion | Frees the memory allocated for credential assertion |

TABLE 1-continued

| WebAuthn API Intercepted | Description |
| --- | --- |
| WebAuthNGetCancellationId | Gets GUID to identify In Progress WebAuthn Operation |
| WebAuthNCancelCurrentOperation | Cancel operation in progress |
| WebAuthNGetErrorName | Returns well defined WebAuthn error name |
| WebAuthNGetW3CExceptionDOMError | Returns HRESULT status code |

In the following, FIDO2 double-hop redirection to a trusted mobile device is now discussed. When a desktop device does not have FIDO2 capabilities, a FIDO2-capable mobile device, securely paired to the desktop device, can be used to fulfill the authentication operations. In particular, both new user registration (make credential) and get and verify assertion operations could be delegated.

To securely bootstrap the mobile device with a desktop device, a native application (e.g., CWA) on the desktop device may, upon determining that it does not run on a FIDO2-capable device, prompt the user to unlock and pair their mobile device. Upon unlocking the mobile device, a native application (e.g., CWA) on the mobile device may establish a secure communication channel with CWA on the desktop device. For example, one or more of Bluetooth, WiFi, near field communications (NFC), QR Code may be used. To further secure the communication, Transport Layer Security (TLS) may be used over Bluetooth or WiFi. Certificates pinned at the first CWA and second CWA may be used for client and server certificate authentication with TLS. After completing a set of authentication operations, the secure channel between the first CWA and second CWA may be terminated.

Furthermore, to achieve security, resiliency and high performance, the authenticated credential identifiers (IDs) may be stored on all or a subset of the hosted desktop, the endpoint device and the mobile device. In particular, after completing the authentication operations, the credential ID may be cached at the endpoint device 601 or the hosted browser 615 (in the virtual session). Thus, the cached credential ID can advantageously be used as a cookie for further authenticated operations without requiring the user to unlock and connect their mobile device. The cached credential at the hosted browser may be used as a first choice. However, due to session disconnects-reconnects, refreshing a pooled VDA or Citrix secure browser instance, or session roaming to a different RDSH host, the cached credential at the hosted browser may not be available. Therefore, the cached credential at the first CWA may be used, including to refresh the credential at the hosted browser, again without requiring continued use of the mobile device. As a last resort, if both of the cached credentials at the hosted browser and the first CWA are unavailable, e.g., the user has roamed to a different endpoint device, then the cached credential at the second CWA (on the mobile device) may be used after requiring the user to connect the mobile device but still without prompting them for additional authentication.

It should be appreciated that any of the features described above can be combined with the computing system 200, 300, 400, 500, 600.

Figure 7:
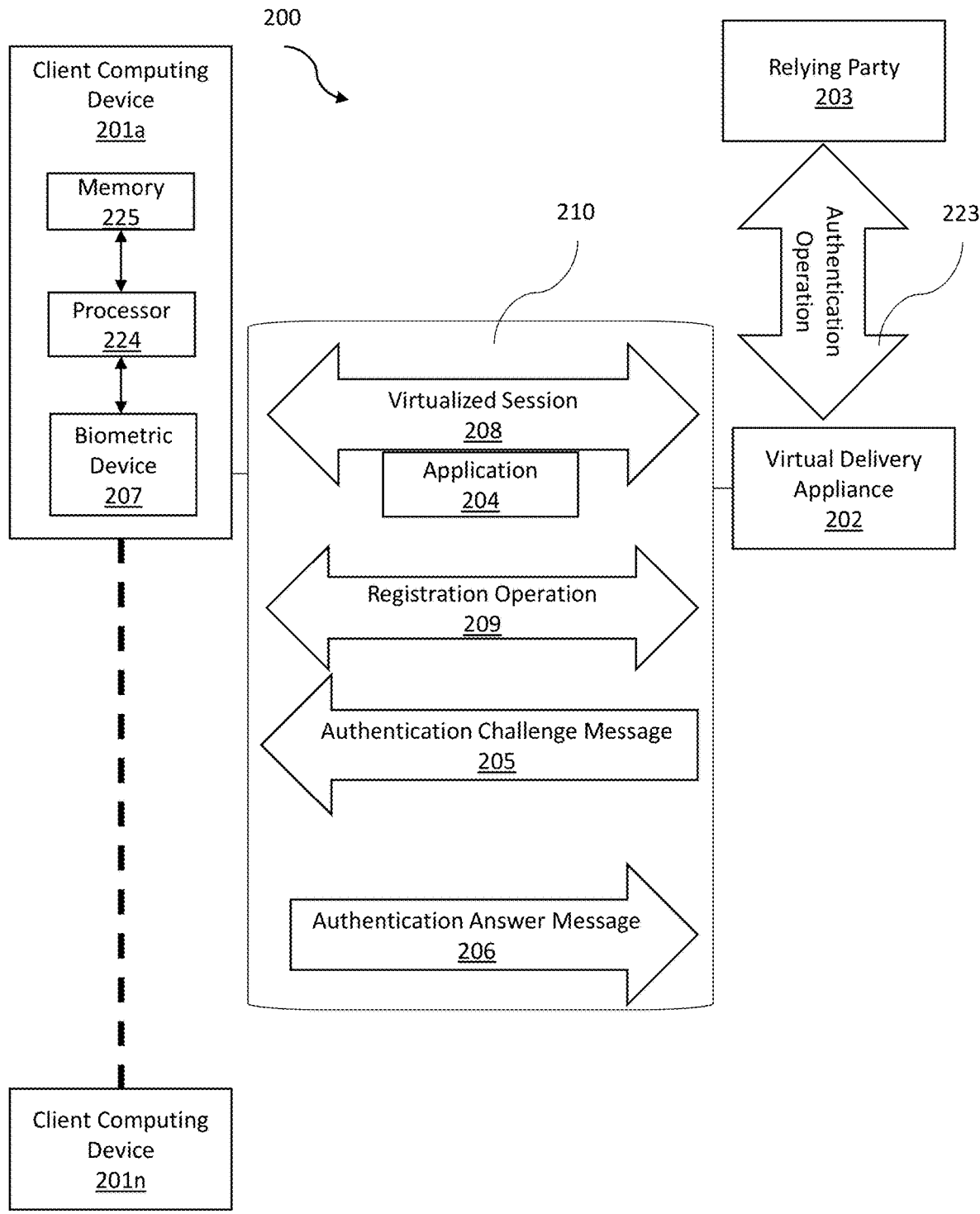
FIG. 7 is a schematic block diagram of the computing system in accordance with a second example embodiment.

Referring now to FIG. 7, a computing system 200 illustratively comprises a plurality of client devices 201a-201n, and a virtual delivery appliance 202 configured to communicate with the plurality of client devices. In particular, the virtual delivery appliance 202 is configured to communicate with a given client device 201a over a network, for example, the Internet, or a local network, to provide the client device with a virtualized session 208 for a user.

The virtual delivery appliance 202 is configured to communicate with the given client device 201a over the network to perform a registration operation 209 with a relying party 203. An application 204 within the virtualized session 208 performs an authentication operation 223 with the relying party 203 to access a resource. For example, the application 204 comprises a web browser application, a native application operating within the virtualized session 208, or an interface for a local resource. In some embodiments, the resource and relying party 203 are remote to the virtual delivery appliance 202, but in some applications, the resource and the relying party are local to the virtual delivery appliance, for example, in a trust elevation situation, or a step-up authentication scenario.

The virtual delivery appliance 202 is configured to forward an authentication challenge message 205 to the given client device 201a in response to the application 204 receiving the authentication challenge message from the relying party 203 for the user to access the resource. The virtual delivery appliance 202 is configured to receive an authentication answer message 206 in response to the authentication challenge message 205 from the given client device 201a.

The given client device 201a illustratively includes a biometric device 207 configured to generate the biometric characteristic of the user. The given client device 201a also includes a processor 224 coupled to the biometric device 207, and a memory 225 coupled to the processor.

The authentication answer message 206 is based upon a biometric characteristic of the user accessible from the memory 225 of the given client device 201a. The application 204 forwards the authentication answer message 206 to the relying party 203 to complete the authentication operation 223. Also, the given client device 201a and the virtualized session 208 are configured to operate a virtual channel 210 therebetween for wrapping the authentication challenge message 205 and the authentication answer message 206 within a channel protocol.

Also, in some embodiments, the processor 224 is configured to receive a web authentication API command from the relying party 203. The processor 224 is configured to translate the web authentication API command from the relying party 203 into the authentication challenge message 205. The given client device 201a is configured to generate the web authentication API command based upon the authentication challenge message 205. The web authentication API command may comprise a WebAuthn standard authentication command, for example.

In other embodiments, the application 204 operates within a virtual OS, and the virtual OS comprises a native authentication interface. The processor 224 is configured to intercept an authentication OS command of the native authentication interface from the relying party 203. The processor 224 is configured to translate the authentication OS command from the relying party 203 into the authentication challenge message 205, and the given client device 201a is configured to reconstruct the authentication OS command based upon the authentication challenge message.

Figure 8A:
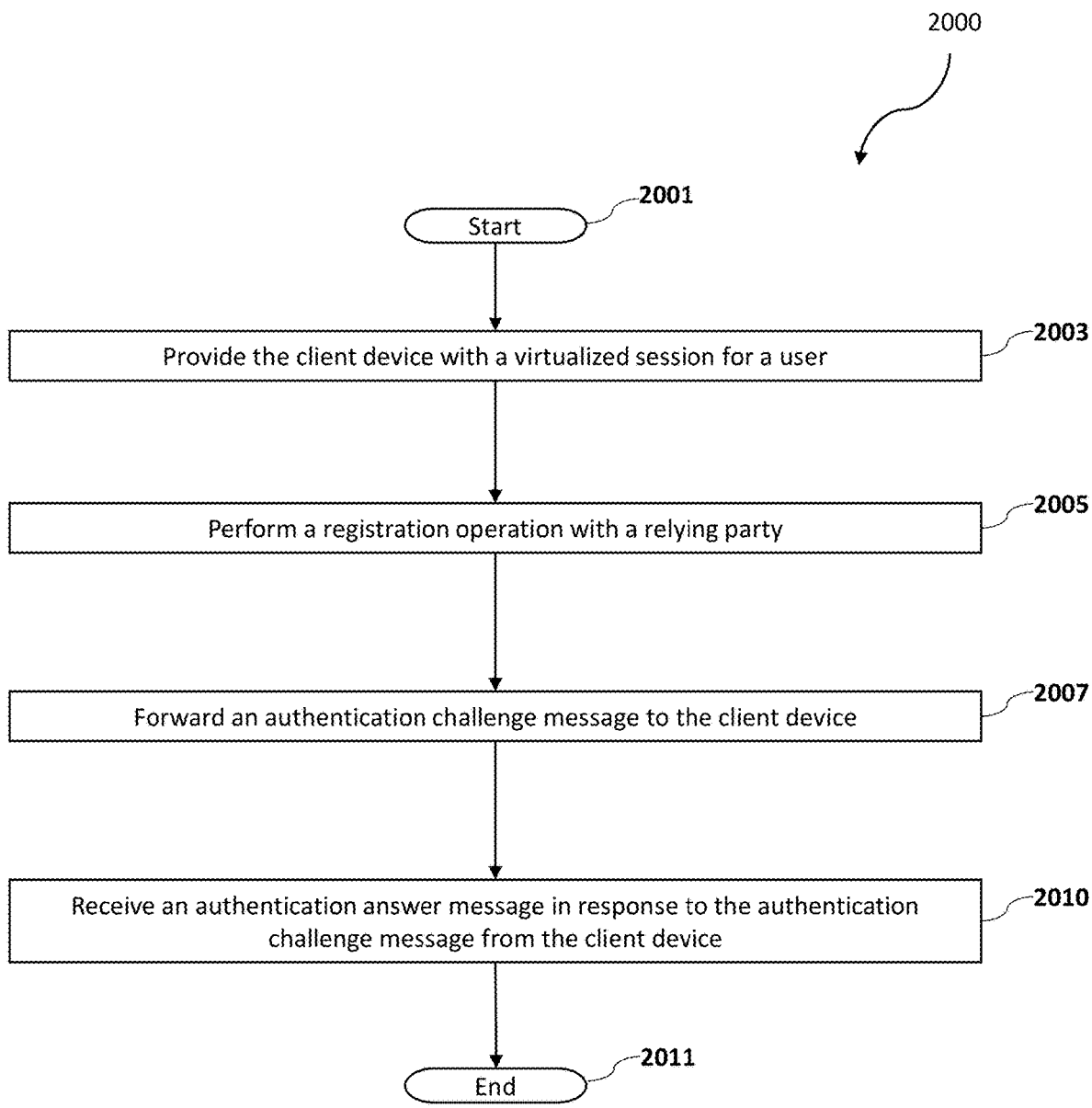
FIG. 8A-8B are flowcharts for a series of steps performed by the virtual delivery appliance in the computing system of FIG. 7.

Referring now to the flowchart 2000 in FIG. 8A, and generally speaking, a method for operating a virtual delivery appliance 202 is described. From the start (Block 2001), the method includes providing a given client device 201a with a virtualized session 208 for a user (Block 2003), performing a registration operation 209 with a relying party 203 (Block 2005), forwarding an authentication challenge message 205 to the given client device (Block 2007), and receiving an authentication answer message 206 in response to the authentication challenge message from the given client device (Block 2010). The method ends at Block 2011.

Figure 8B:
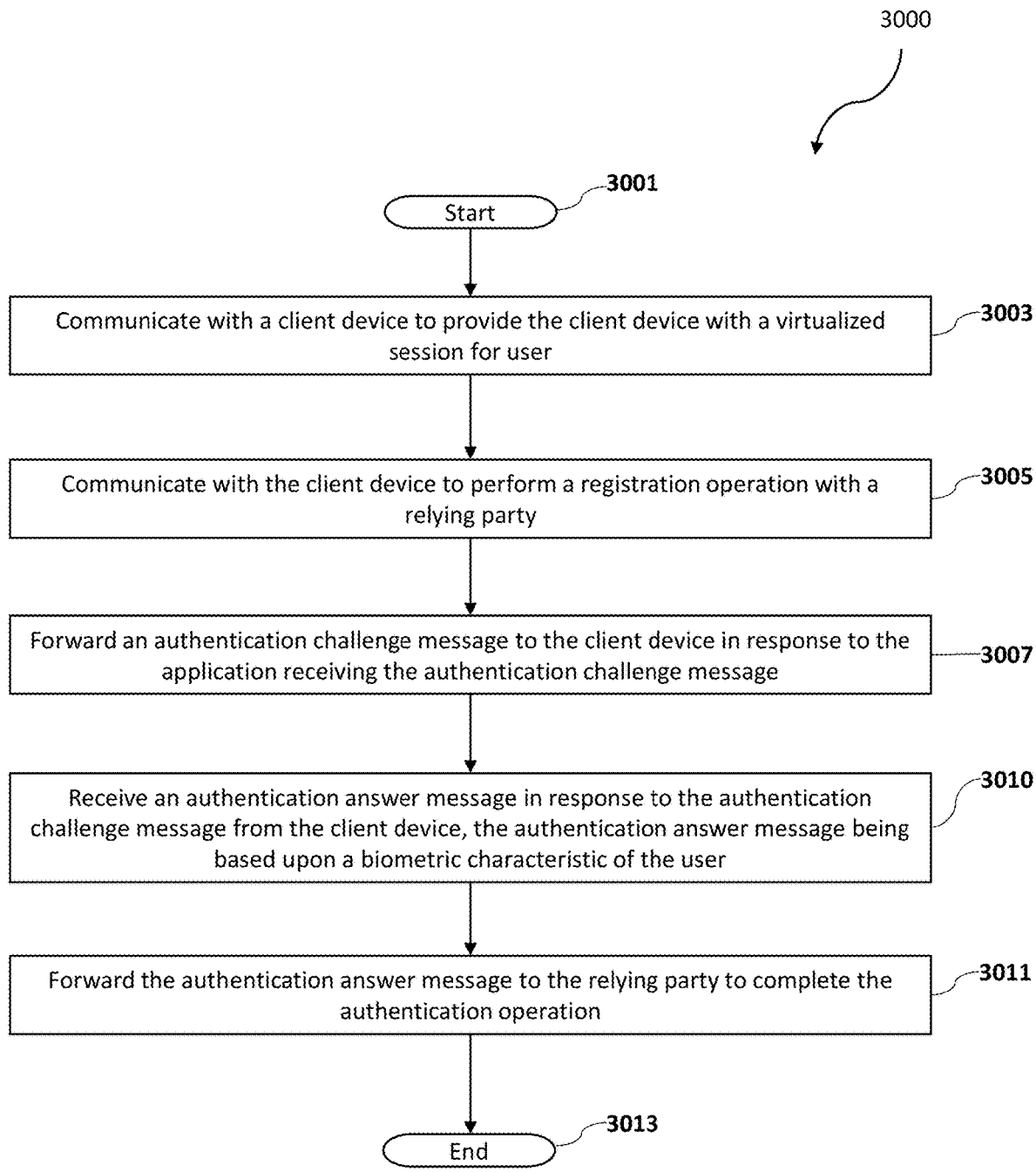

Referring now to the flowchart 3000 in FIG. 8B, more detailed steps for operating a virtual delivery appliance 202 are described. From the start (Block 3001), the method includes communicating with a given client device 201a over a network to provide the given client device with a virtualized session 208 for a user (Block 3003), and communicating with the given client device over the network to perform a registration operation 209 with a relying party 203 (Block 3005). An application 204 within the virtualized session 208 performs an authentication operation 223 with the relying party 203 to access a resource. The method includes forwarding an authentication challenge message 205 to the given client device 201a in response to the application 204 receiving the authentication challenge message from the relying party 203 for the user to access the resource (Block 3007), and receiving an authentication answer message 206 in response to the authentication challenge message from the given client device (Block 3010). The authentication answer message 206 is based upon a biometric characteristic of the user accessible from a memory of the given client device 201a. The application 204 forwards the authentication answer message 206 to the relying party 203 to complete the authentication operation 223 (Block 3011). The method ends at Block 3013.

Another aspect is directed to a non-transitory computer readable medium for operating a virtual delivery appliance 202 with the non-transitory computer readable medium having a plurality of computer executable instructions for causing the virtual delivery appliance to perform steps of the methods illustrated in FIGS. 8A-8B.

Figure 9:
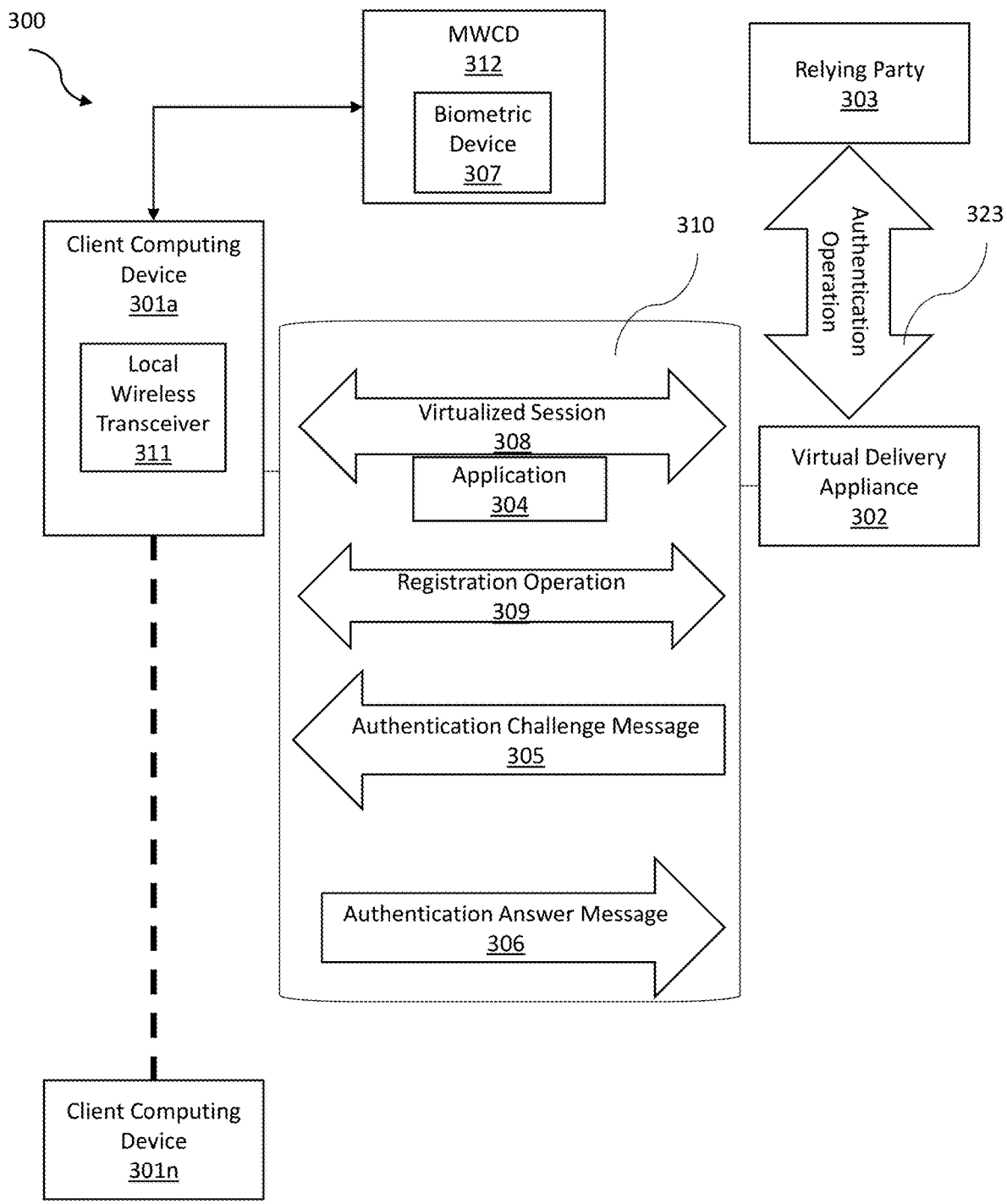
FIG. 9 is a schematic block diagram of the computing system in accordance with a third example embodiment.

Referring now additionally to FIG. 9, another embodiment of the computing system 300 is now described. In this embodiment of the computing system 300, those elements already discussed above with respect to FIGS. 7 & 8A-8B are incremented by 100 and most require no further discussion herein. This embodiment differs from the previous embodiment in that this computing system 300 comprises a mobile wireless communications device (MWCD) 312 in communication with the given client device 301a. The given client device 301a comprises a local wireless transceiver 311 configured to exchange the authentication challenge message 305 and the authentication answer message 306 with the MWCD 312. For example, the local wireless transceiver 311 comprises a Bluetooth wireless transceiver, an NFC transceiver, for example. Here, the MWCD 312 includes a biometric device 307 configured to generate the biometric characteristic of the user.

Figure 10:
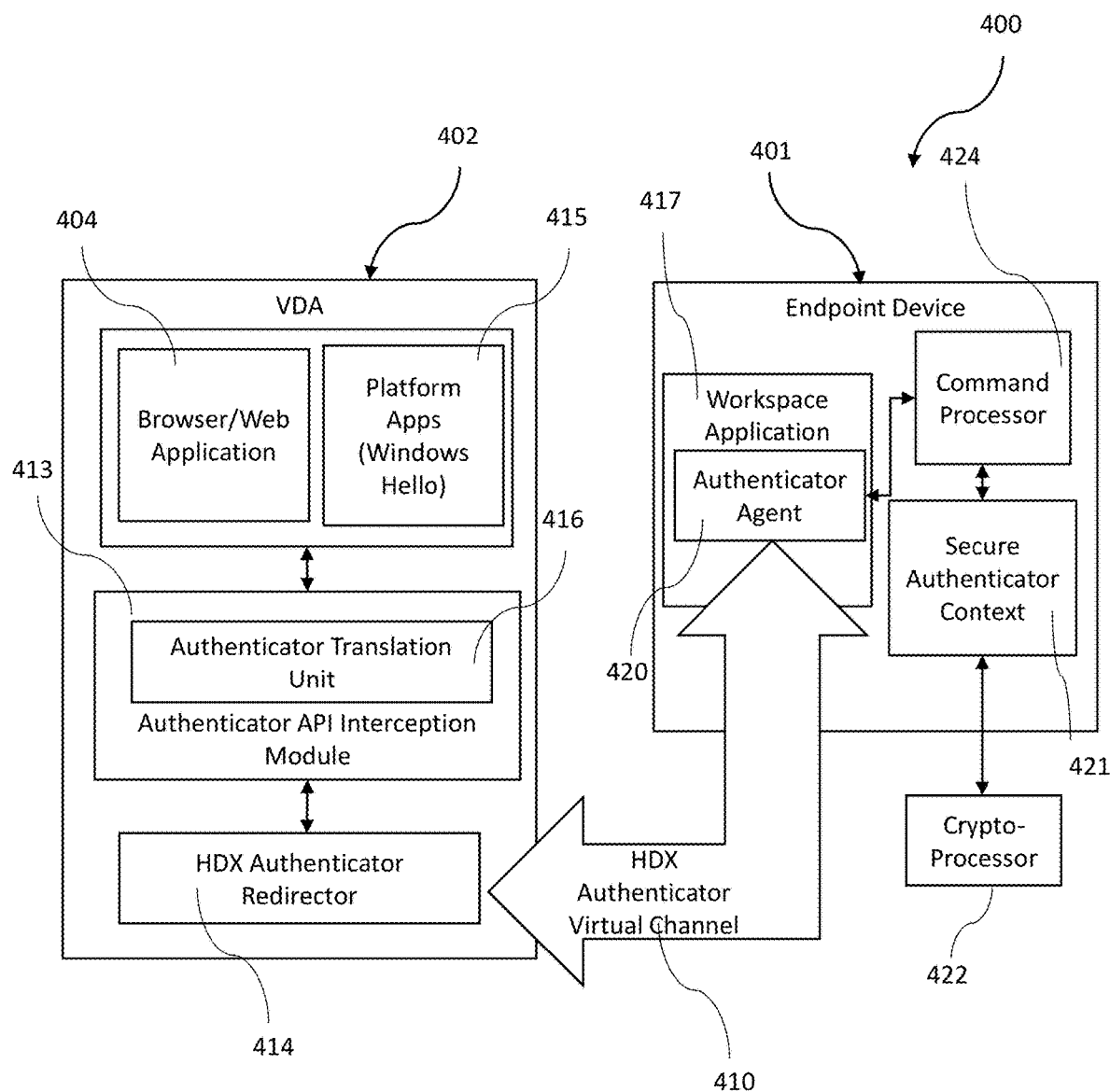
FIG. 10 is a schematic block diagram of the computing system in accordance with a fourth example embodiment.

Referring now additionally to FIG. 10, another embodiment of the computing system 400 is now described. In this embodiment of the computing system 400, those elements already discussed above with respect to FIGS. 7 & 8A-8B are incremented by 200 and most require no further discussion herein. This embodiment differs from the previous embodiment in that this computing system 400 comprises the given client device 401 comprising a workspace application 417 with an authenticator agent module 420 therein and being coupled to the processor 424. The given client device 401 illustratively comprises a secure authenticator context module 421 coupled to the processor 424, and a crypto-processor 422 coupled to the secure authenticator context module 421.

The virtual delivery appliance 402 illustratively includes an application 404 in communication with a platform application 415. For example, the platform application 415 may comprise Microsoft Windows Hello Platform. The virtual delivery appliance 402 comprises an authenticator API interception module 413 with an authenticator translation unit 416, and an authenticator redirector module 414 coupled to the authenticator API interception module 413. The authenticator redirector module 414 and the authenticator agent module 420 operate an authenticator virtual channel 410 therebetween.

Figure 11:
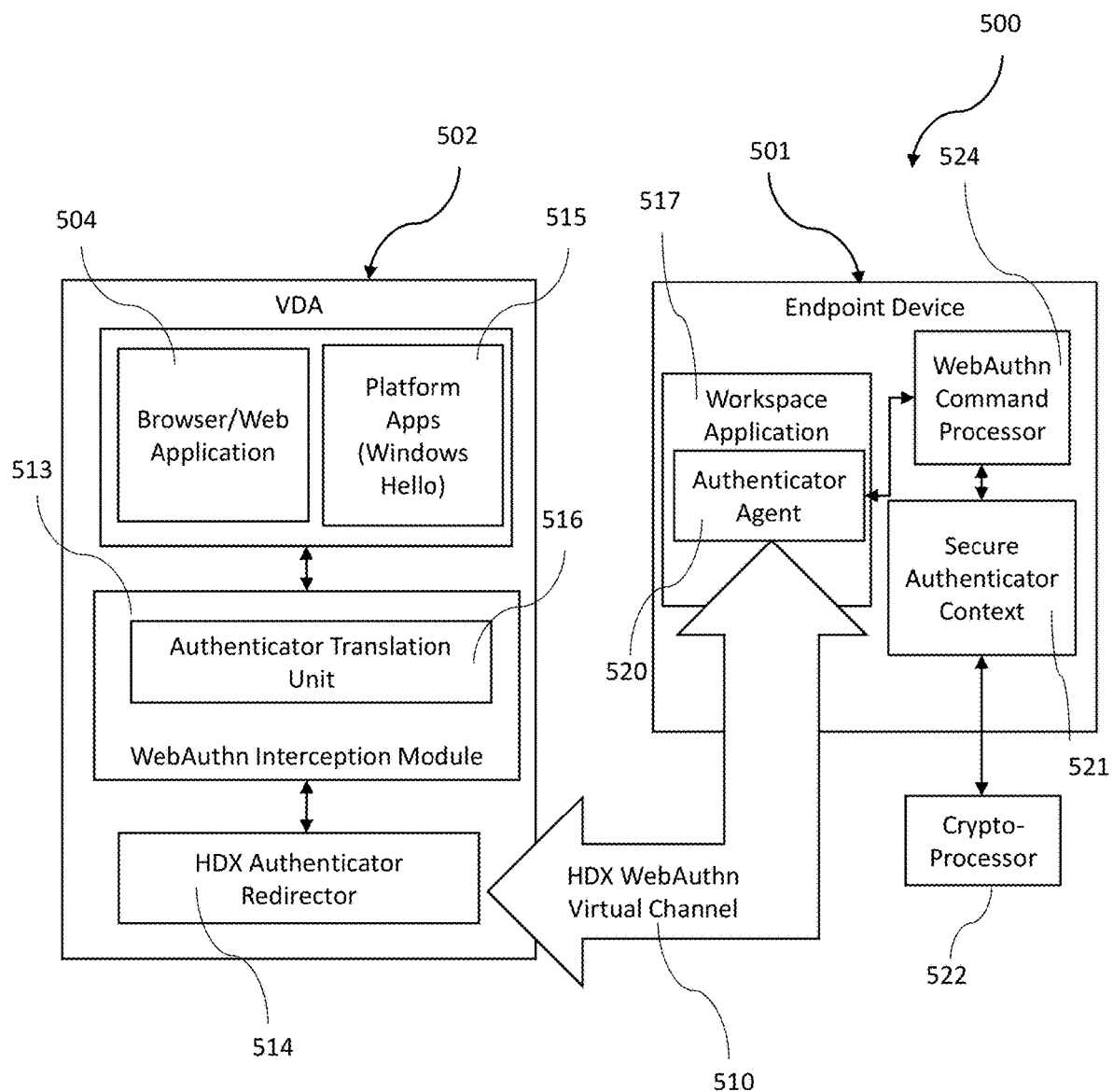
FIG. 11 is a schematic block diagram of the computing system in accordance with a fifth example embodiment.
Figure 12:
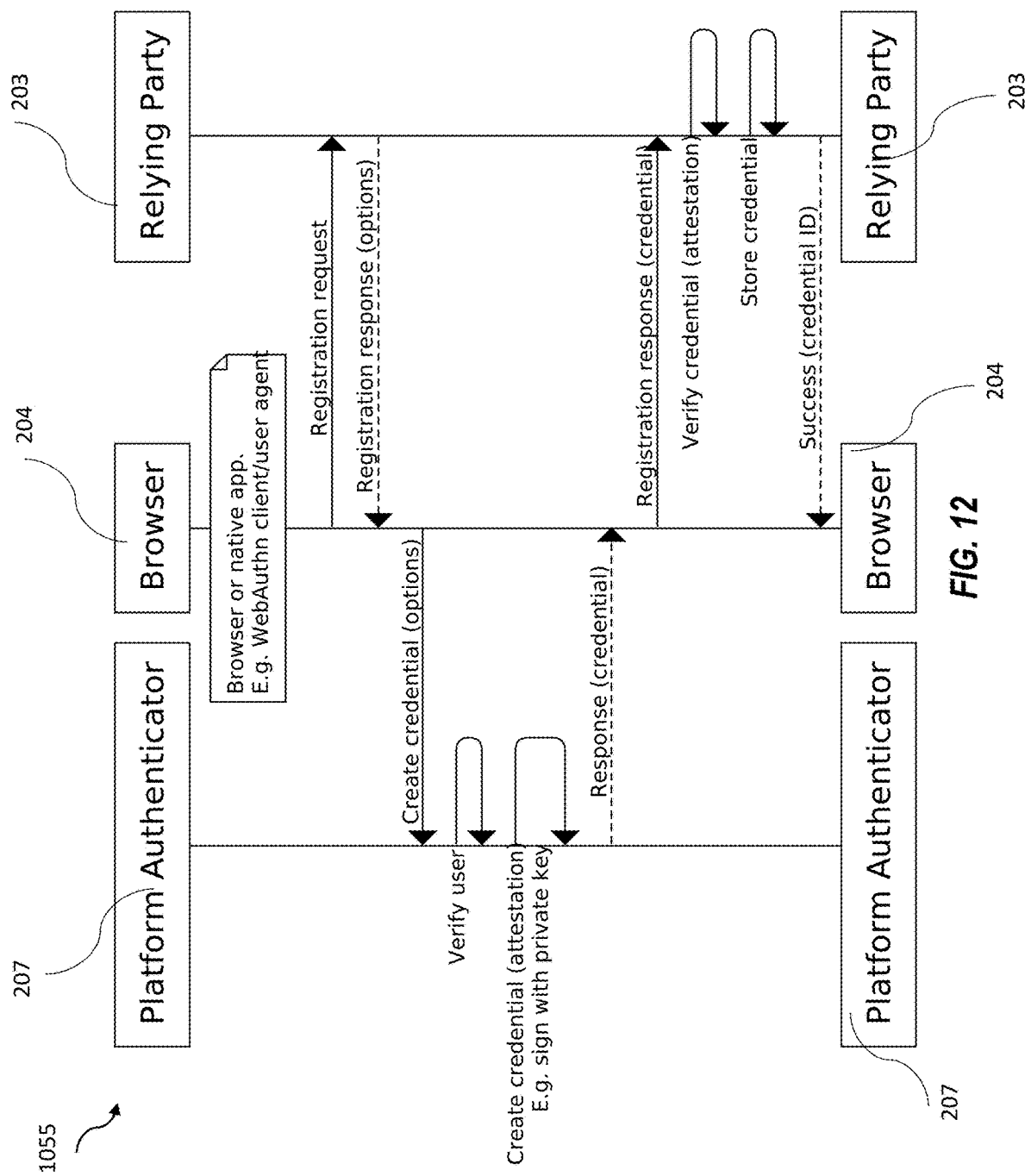
FIG. 12 is a sequence diagram illustrating registration operations in an example embodiment of the computing system of FIG. 7.
Figure 13:
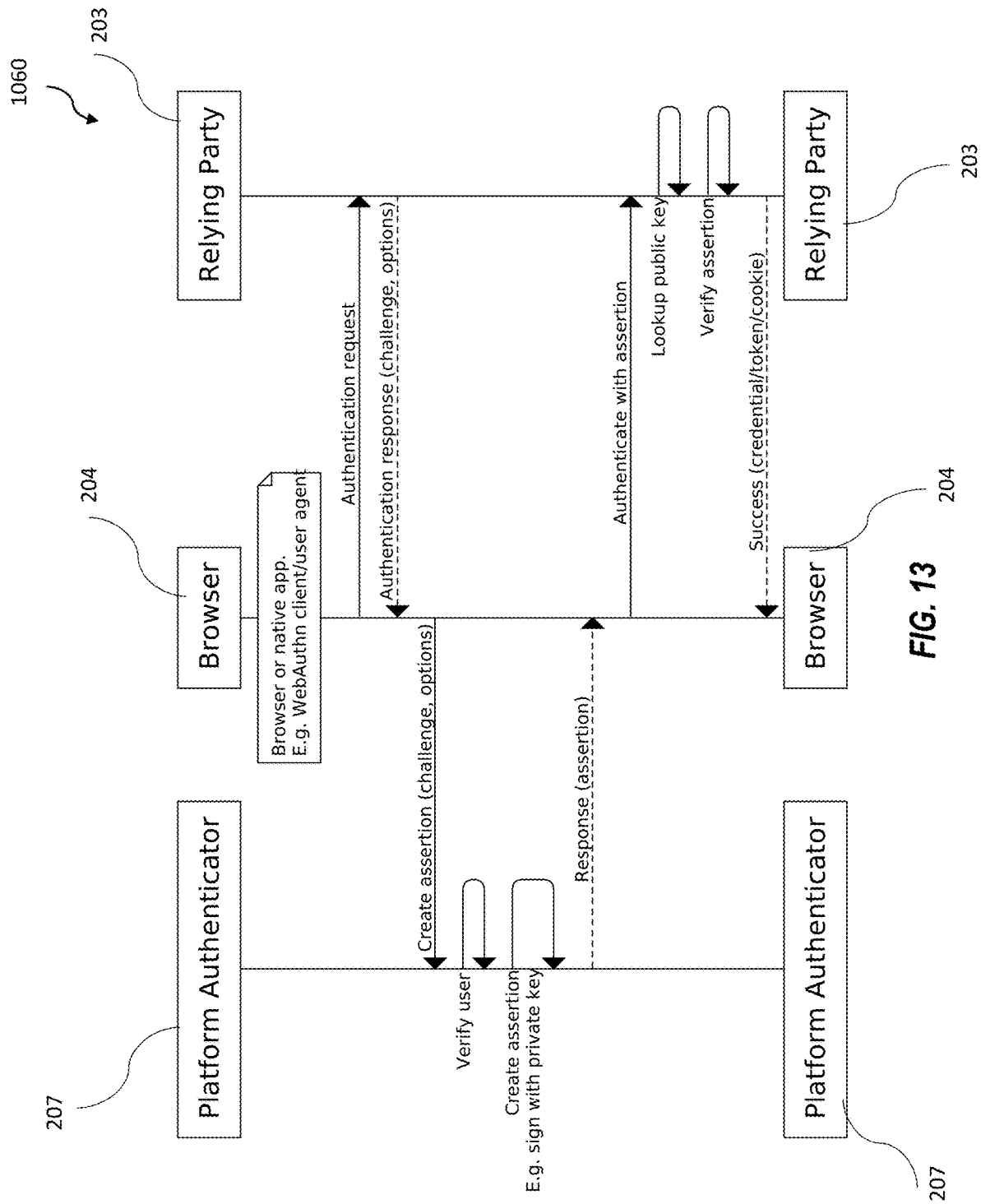
FIG. 13 is a sequence diagram illustrating authentication operations in an example embodiment of the computing system of FIG. 7.
Figure 14A:
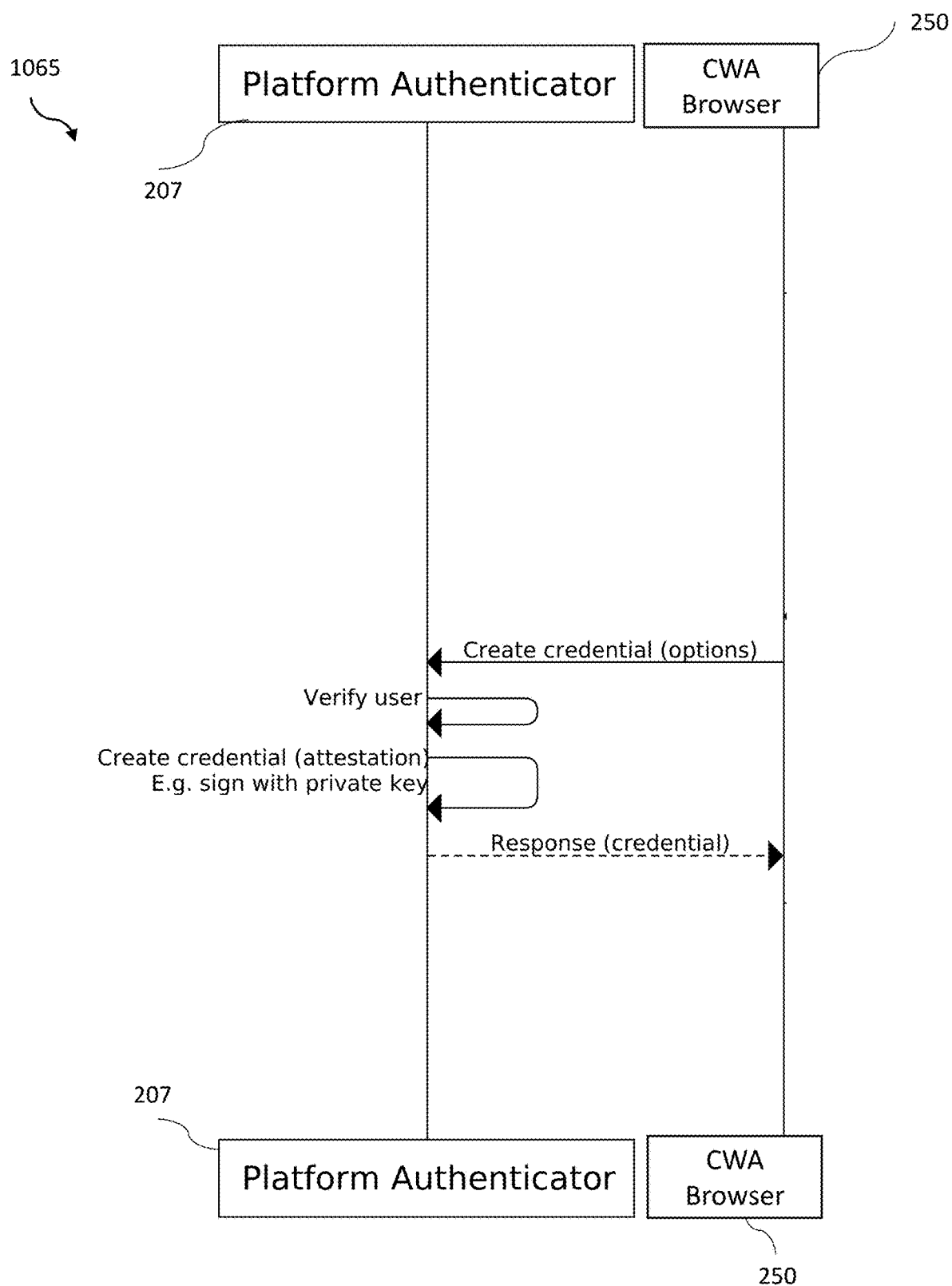
FIGS. 14A-14B are a sequence diagram illustrating registration operations in an example embodiment of the computing system of FIG. 7.
Figure 14B:
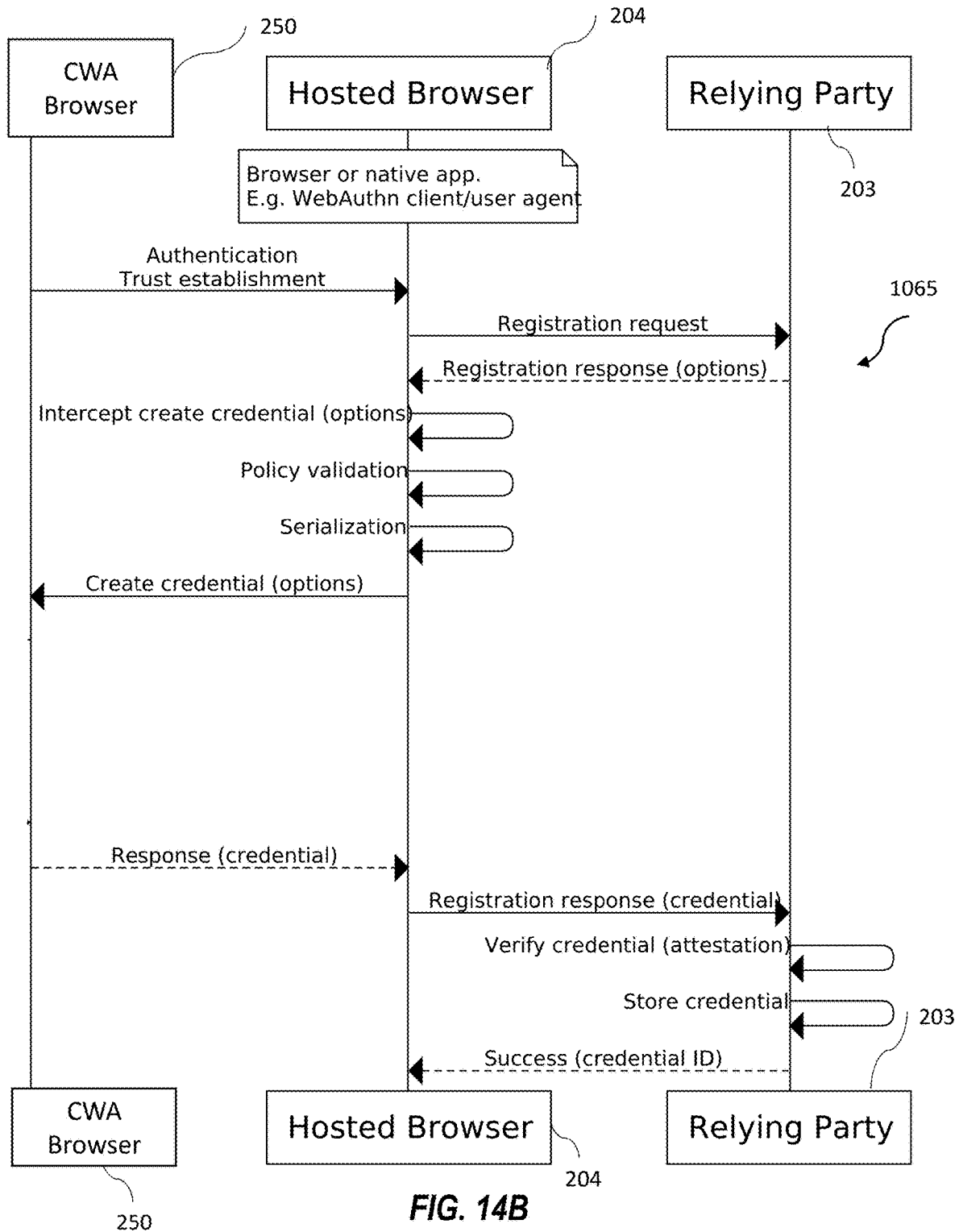
Figure 15A:
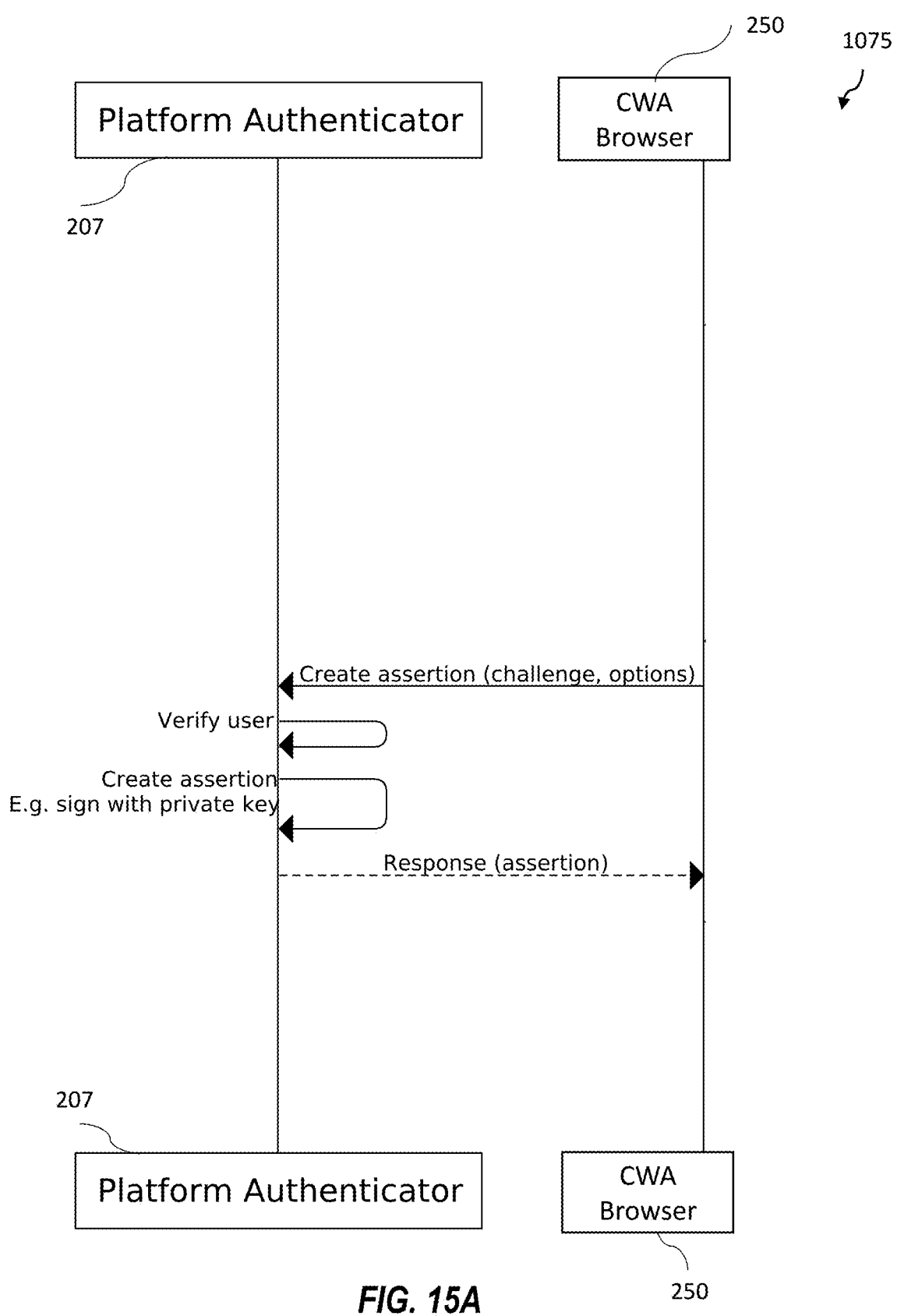
FIGS. 15A-15C are a sequence diagram illustrating authentication operations in an example embodiment of the computing system of FIG. 7.
Figure 15B:
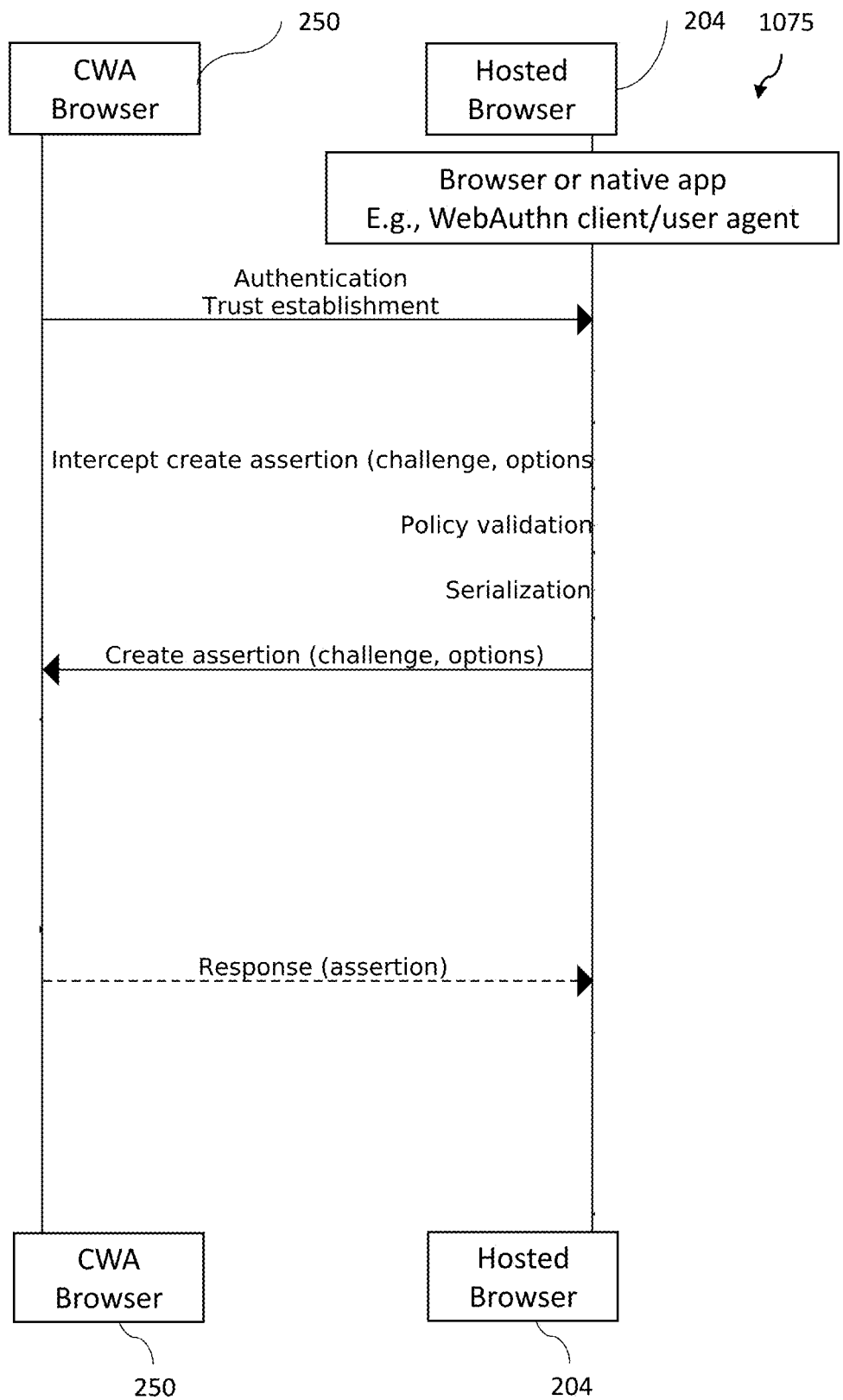
Figure 15C:
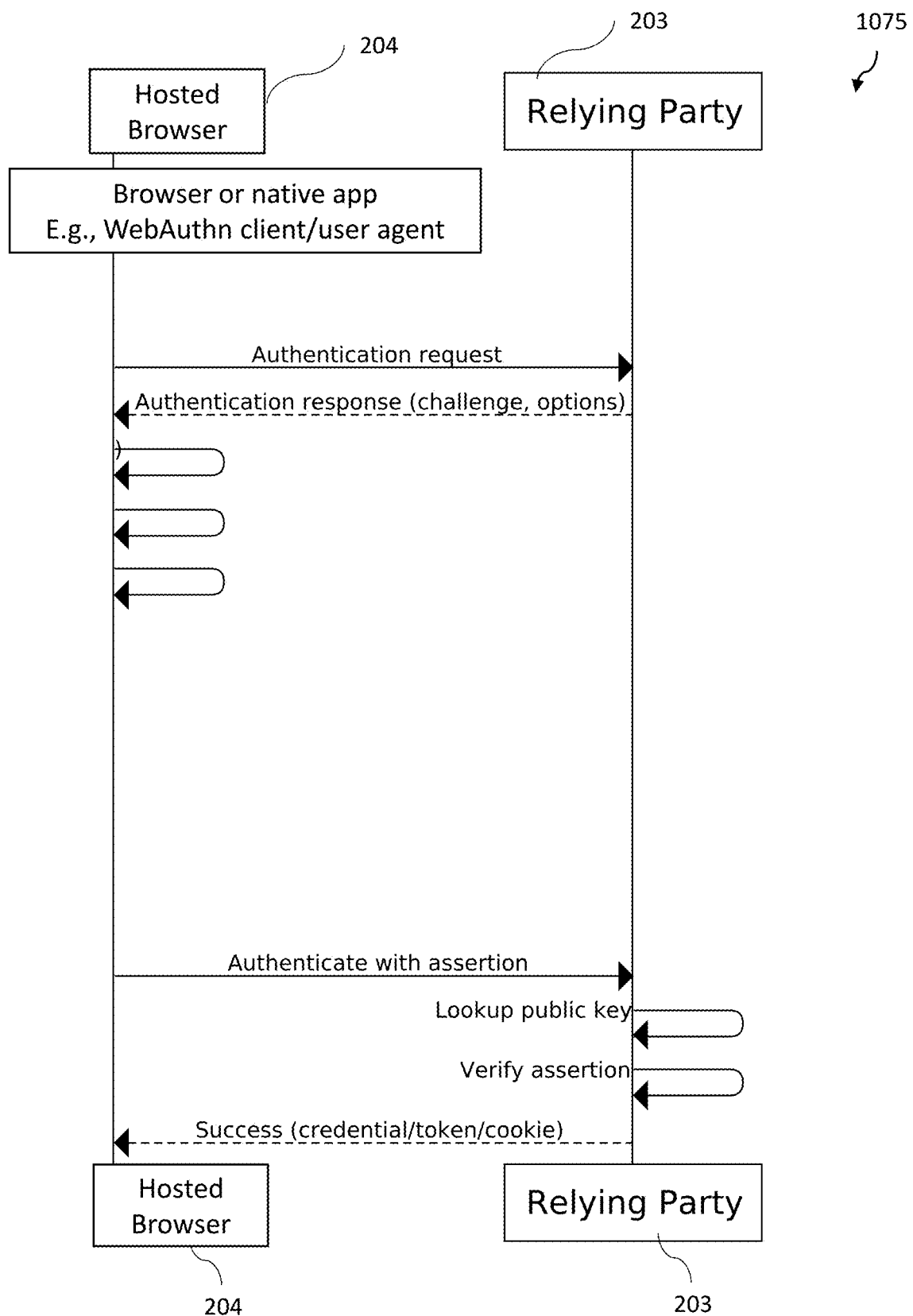
Figure 16A:
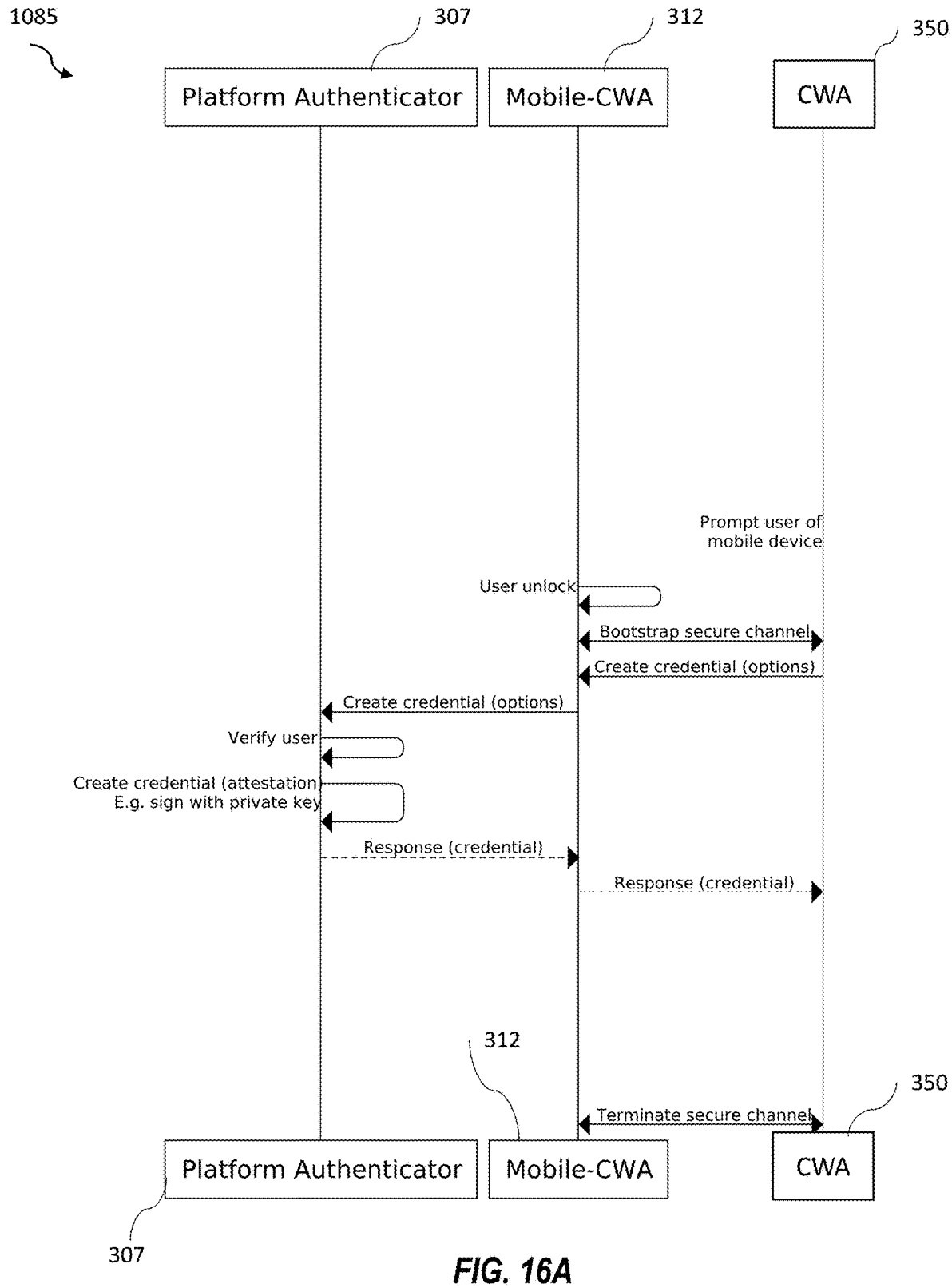
FIGS. 16A-16B are a sequence diagram illustrating registration operations in an example embodiment of the computing system of FIG. 9.
Figure 16B:
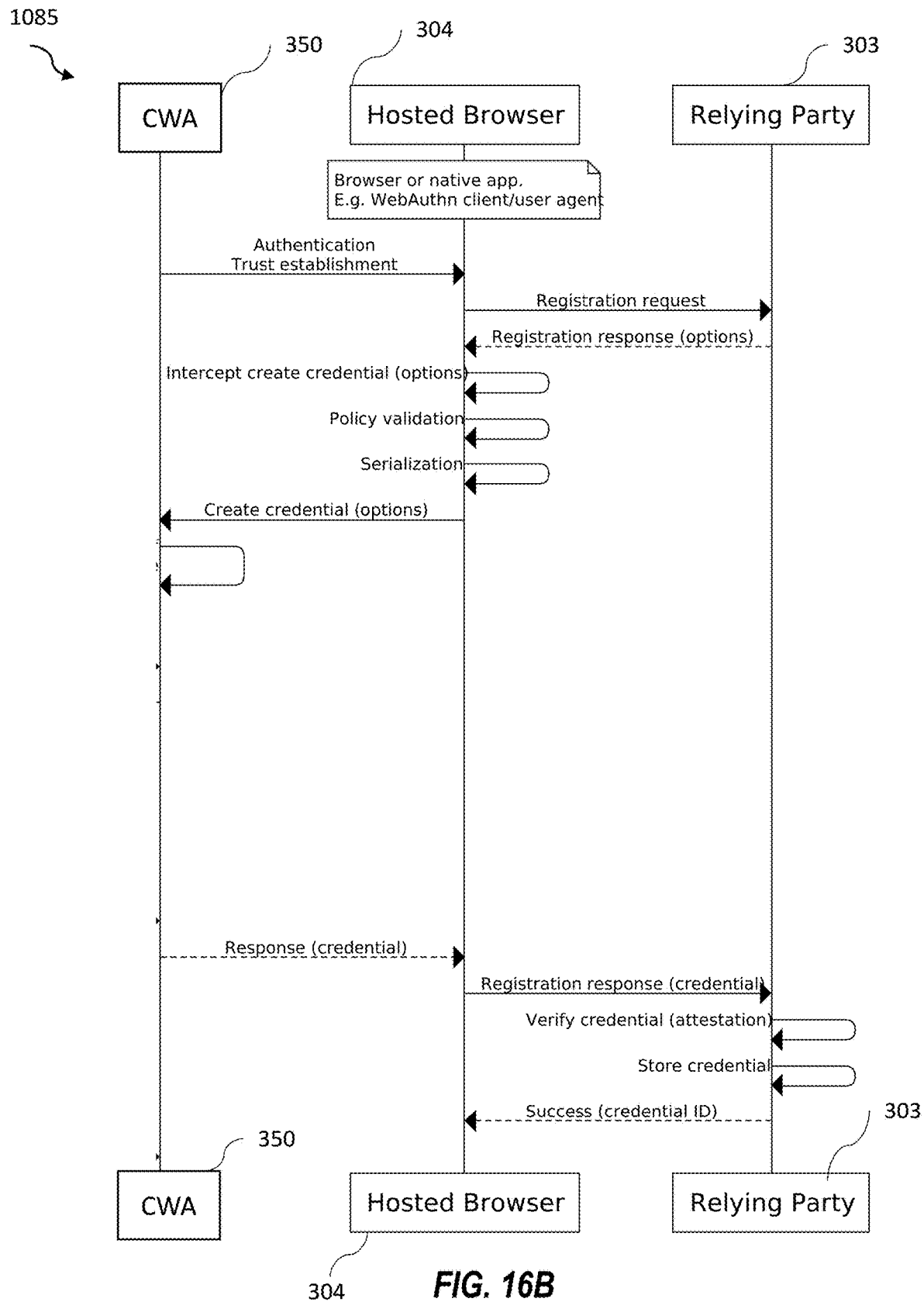
Figure 17A:
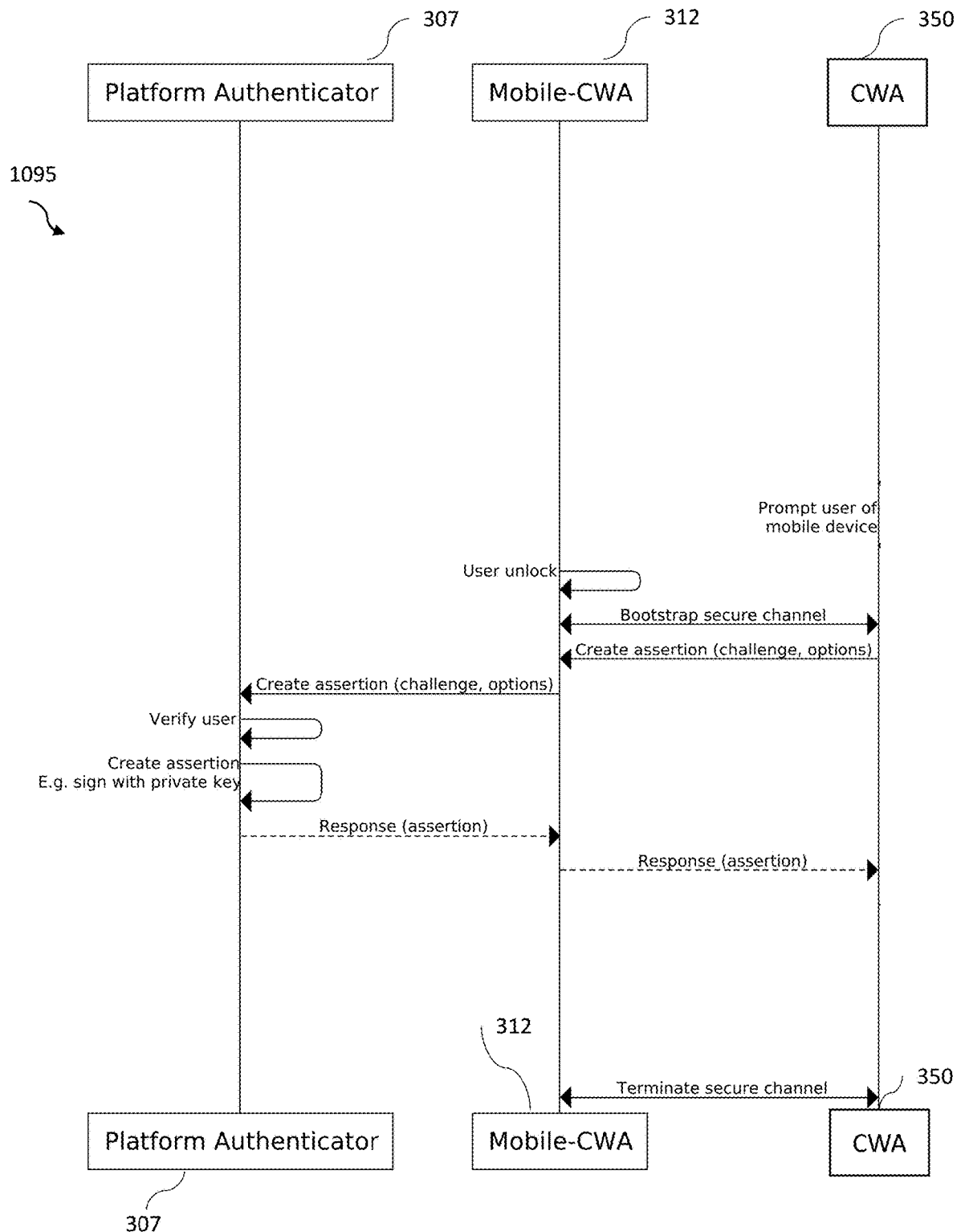
FIGS. 17A-17B are a sequence diagram illustrating authentication operations in an example embodiment of the computing system of FIG. 9.
Figure 17B:
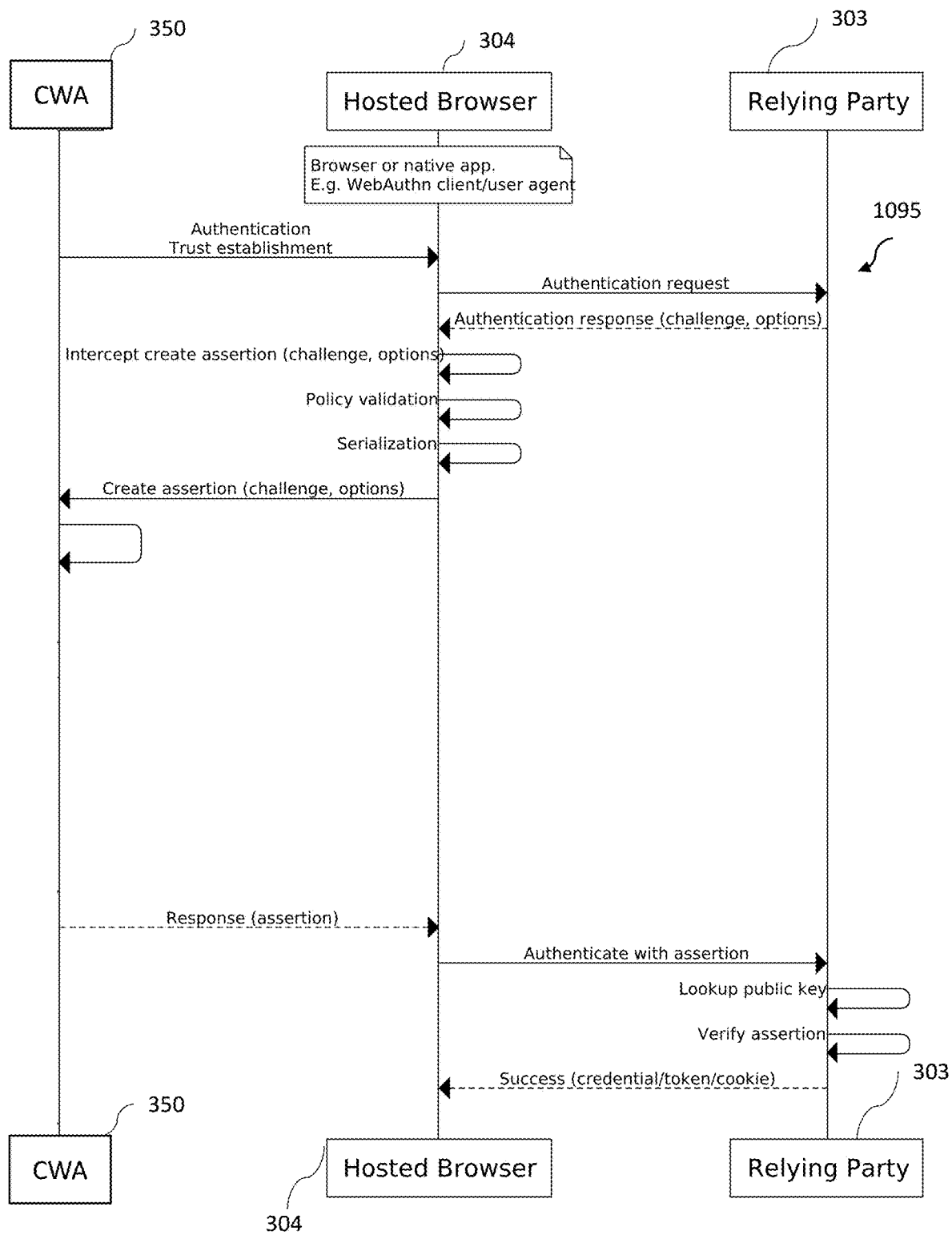
Figure 18:
FIG. 18 is a screen print illustrating a user interface in an example embodiment of the computing system of FIG. 7.
Figure 19:
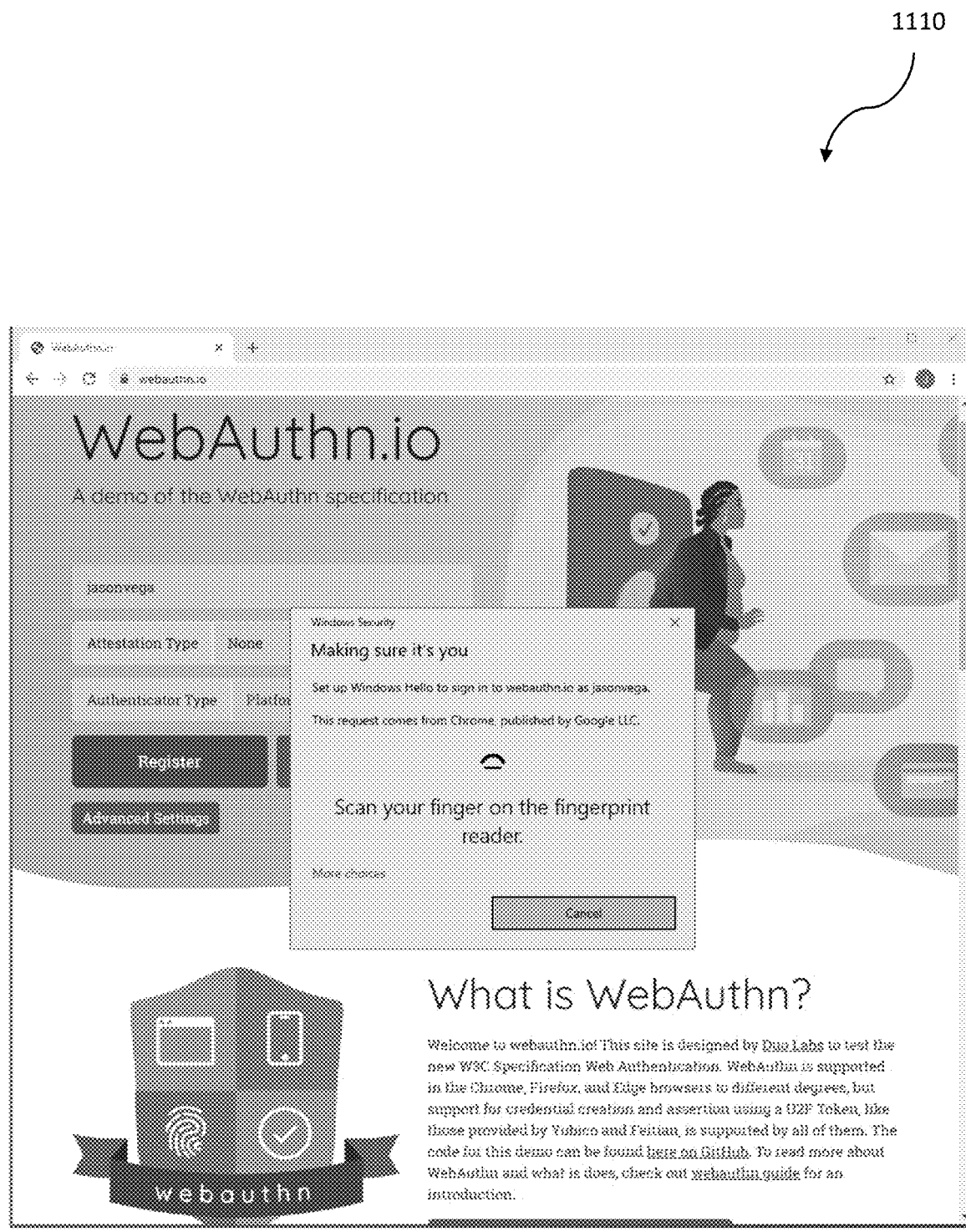
FIG. 19 is a screen print illustrating a registration interface in an example embodiment of the computing system of FIG. 7.
Figure 20:
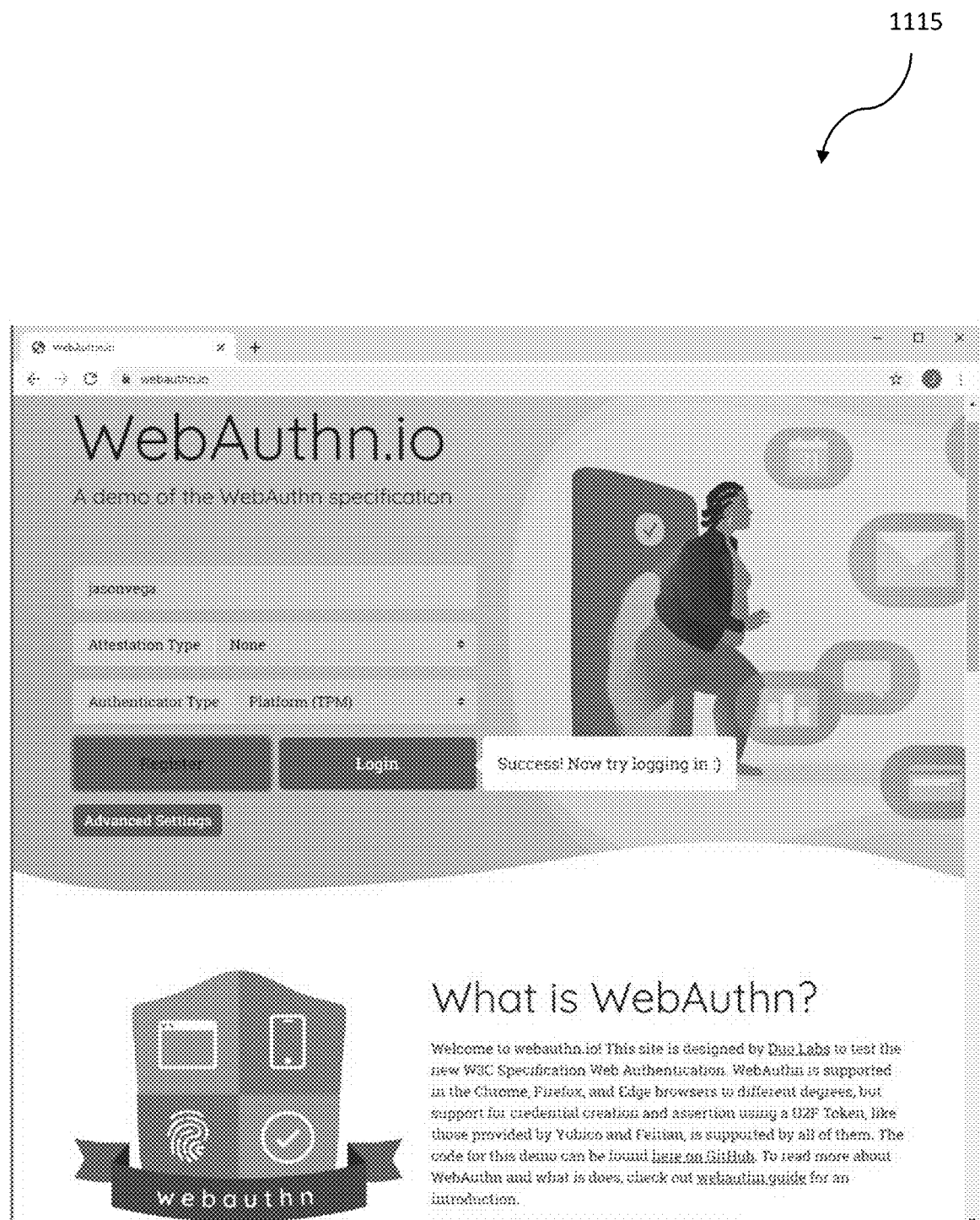
FIG. 20 is a screen print illustrating a registration interface in an example embodiment of the computing system of FIG. 7.
Figure 21:
FIG. 21 is a screen print illustrating a login interface in an example embodiment of the computing system of FIG. 7.
Figure 22:
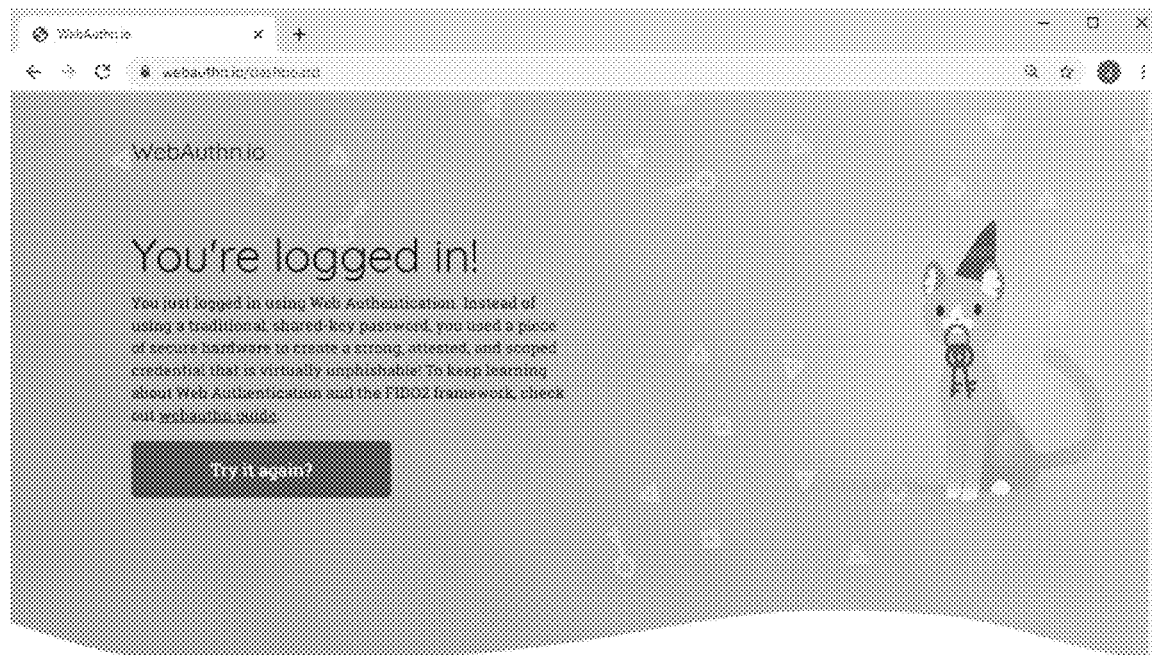
FIG. 22 is a screen print illustrating a login interface in an example embodiment of the computing system of FIG. 7.

Referring now additionally to FIG. 11, another embodiment of the computing system 500 is now described. In this embodiment of the computing system 500, those elements already discussed above with respect to FIG. 10 are incremented by 100 and most require no further discussion herein. This embodiment differs from the previous embodiment in that this computing system 500 uses a Web Authentication (WebAuthn) standard.

The flow of the operations for the computing systems 400, 500 of FIGS. 10-11 is as follows. A published browser (application 404, 504) in the datacenter (virtual session) also plays the role of a web authentication client. It interacts with a FIDO2 relying party server using the standard web authentication APIs (WebAuthn). The authenticator translation unit 416, 516 is loaded by the authenticator API interception module 413 (or WebAuthn interception module 513) and employs the translation engine that marshals or otherwise transforms the input for authentication operations to be executed by the remote authenticator into a biometric authenticator request message. The authenticator translation unit 416, 516 is also responsible for unmarshalling or otherwise reverting the biometric authenticator redirector 414, 514 response messages into input for authentication operations and passes them to the web authentication client (the hosted browser 404, 504).

The authenticator API interception module 413 (or WebAuthn interception module 513), authenticator redirector module 414, 514 in the hosted virtual session, and the authenticator agent module 420, 520 at the client device 401, 501 are the components that support a secure virtual channel 410, 510 transmit and receive operations, WebAuthn request and response commands. The role of the authenticator agent module 420, 520 is the stack management of the presentation protocol (e.g., Citrix HDX/ICA) which includes setup, tear down and state machine maintenance of the virtual channel protocol. In practice, the authenticator agent module 420, 520 may be implemented as a virtual driver, for example, a DLL hosted by an HDX Engine sub-component of CWA.

The command processor 424 (or WebAuthn command processor 524) prepares the authentication operation commands and establishes a secure authenticator context module 421, 521 to enable cryptographic operations with the crypto-processor 422, 522. The command processor 424 (or WebAuthn command processor 524) commands include key generation and requests to digitally sign a payload from previously generated keys that aid in the authentication process.

The secure authenticator context module 421, 521 executes the commands prepared by the command processor 424, 524 and returns the results of the native authenticator operations to the command processor 424, 524. The command processor 424, 524 builds an HDX WebAuthn authenticator response command and relays it back to the host. At the host, the HDX authenticator redirector module 414, 514 then passes the response command to the authenticator API interception module 413 (or WebAuthn interception module 513) that uses the translation unit to decode the response into the appropriate data structure, and after that to the web authentication client (the hosted browser 404, 504) that initiated the request on behalf of the application.

Referring now to FIGS. 12-17B, sequence diagrams 1055, 1060, 1065, 1075, 1085, 1095 illustrate operations in example embodiments of the computing system 200, 300, 400, 500.

Diagram 1055 shows a process for new user registration. This is the process for creating a new authentication credential. First, the browser 204 initializes a registration process with the relying party 203. The relying party 203 then responds to the browser 204 with registration options. The browser 204 then creates the credential with the platform authenticator 207 based on the options and a biometric of the user, which requires successful user verification by the platform authenticator 207. The browser 204 then sends the credential to the relying party 203, and receives a credential ID back. For purposes of illustration, the diagram 1055 describes successful new user registration, but it should be understood that the process is similar for failed new user registration. For example, failure to verify the user will result in the platform authenticator 207 returning a failure response (and no credential) to the browser 204, etc.

Diagram 1060 shows a process for authentication of the registered user. First, the browser 204 initializes an authentication process with the relying party 203. The browser 204 then receives the authentication challenge message and authentication options from the relying party 203 and forwards them to the platform authenticator 207. After successful user verification by the platform authenticator 207, the platform authenticator 207 creates an authentication answer message, and sends it to the browser 204. The browser 204 then sends the authentication answer message to the relying party 203. The relying party 203 sends a success message with credential/token/cookie back to the browser 204 to complete the authentication. For purposes of illustration, the diagram 1060 describes successful authentication of the registered user, but it should be understood that the process is similar for failed user authentication. For example, failure to verify the user will result in the platform authenticator 207 creating a failure authentication answer message and returning it to the browser 204, etc.

Diagram 1065 shows a process for new user registration within the computing system 200 deploying HDX, for example. In particular, the CWA browser 250 operates on the client computing device 201*a*-201*n*. First, the hosted browser 204 and the CWA browser 250 create authentication trust establishment. The hosted browser 204 initializes a registration process with the relying party 203. The relying party 203 then responds to the browser 204 with registration options. The hosted browser 204 then intercepts the request for creation of the credential and, after policy validation, redirects it to the platform authenticator 207 via the CWA browser 250. After receiving the credential from the platform authenticator 207 via the CWA browser 250, which requires successful user verification by the platform authenticator 207, the hosted browser 204 then sends the credential to the relying party 203, and receives a credential ID back.

Diagram 1075 shows a process for authentication of the registered user within the computing system 200 deploying HDX, for example. First, the hosted browser 204 and the CWA browser 250 create authentication trust establishment. The hosted browser 204 initializes an authentication process with the relying party 203. The hosted browser 204 then receives the authentication challenge and authentication options message from the relying party 203, which generates a WebAuthn command that is intercepted and forwarded to the platform authenticator 207 via the CWA browser 250. After successful user verification by the platform authenticator 207, the platform authenticator 207 creates an authentication answer message, and sends it to the hosted browser 204 via the CWA browser 250. The hosted browser 204 then sends the authentication answer message to the relying party 203. The relying party 203 sends a success message with credential/token/cookie back to the browser 204 to complete the authentication.

Diagram 1085 shows a process for new user registration within the computing system 300 deploying HDX, for example. In particular, the CWA 350 operates on the client computing device 301*a*-301*n*. First, the hosted browser 304 and the CWA 350 create authentication trust establishment. The hosted browser 304 initializes a registration process with the relying party 303. The relying party 303 then responds to the browser 304 with registration options. The hosted browser 304 then intercepts the request for creation of the credential and, after policy validation, redirects it to CWA 350. The CWA 350 then intercepts the request for creation of the credential and prompts the user to unlock and pair a MWCD 312. Upon unlocking the MWCD 312, a mobile CWA 312 operating on the MWCD 312 establishes a secure communication channel with CWA 350. The CWA 350 then redirects the request for creation of the credential to the mobile CWA 312, and then to platform authenticator 307 on the MWCD 312. After receiving the credential from the platform authenticator 307 via the mobile CWA 312 and the CWA 350, which requires successful user verification by the platform authenticator 307, the hosted browser 304 then sends the credential to the relying party 303, and receives a credential ID back.

Diagram 1095 shows a process for authentication within the computing system 300 deploying HDX, for example. First, the hosted browser 304 and the CWA 350 create authentication trust establishment. The hosted browser 304 initializes an authentication process with the relying party 303. The hosted browser 304 then receives the authentication challenge and authentication options message from the relying party 303, which generates a WebAuthn command that is intercepted and forwarded to the CWA 350. The CWA 350 then prompts the user to unlock and pair a MWCD 312. Upon unlocking the MWCD 312, a mobile CWA 312 operating on the MWCD 312 establishes a secure communication channel with CWA 350. The CWA 350 then forwards the WebAuthn command to the platform authenticator 307 via the mobile CWA 312. After successful user verification by the platform authenticator 207, the platform authenticator 307 creates an authentication answer message, and sends it to the hosted browser 304 via the mobile CWA 312 and the CWA 350. The hosted browser 304 then sends the authentication answer message to the relying party 303.

The relying party 303 sends a success message with credential/token/cookie back to the browser 304 to complete the authentication.

FIGS. 18-22 show screen prints 1105, 1110, 1115, 1120, 1125 for a second example embodiment of the computing system 200, 300, 400, 500. Screen prints 1105, 1110, 1115 show a user interface for registration. The user interface illustratively includes fields for a username, attestation type, and an authenticator type, as well as buttons to trigger registration process and login process. Screen prints 1120, 1125 show a login process. Part of the user interface, e.g. the fields for a username, attestation type, and an authenticator type, as well as the buttons to trigger registration process and login process, are all rendered by a hosted browser, such as browser 204, 304, 404, 504 previously discussed, and are presented to the user via the virtualized session (208, 308) (e.g. HDX) graphics remoting to the client device, e.g. one of the client computing devices 201a-201n, 301a-301n. Other parts of the user interface that involve user verification are directly presented directly locally at the client device, e.g. by the Microsoft Windows Hello dialogs "Windows Security. Making sure it's you . . . ", working in conjunction with the platform authenticator 207, 307, and asking the user to answer the biometric authentication challenge, e.g. "Scan your finger on the fingerprint reader".

The present description is made with reference to the accompanying drawings, in which example embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and base 100 reference numerals are used to indicate similar elements in alternative embodiments.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A virtual delivery appliance comprising:
a memory and a processor configured to cooperate with the memory to
communicate with a client device over a network to provide the client device with a virtualized session for a user,
communicate with the client device over the network to perform a registration operation between a relying party and the client device, an application operating within a virtual operating system (OS) comprising a native authentication interface, the application to perform an authentication operation between the client device and the relying party to access a resource,
intercept by the application an authentication OS command of the native authentication interface from the relying party, and translate the authentication OS command into an authentication challenge message,
redirect the authentication challenge message to the client device for the user to access the resource, and
receive an authentication answer message in response to the authentication challenge message from the client device, the authentication answer message being based upon a biometric characteristic of the user accessible from a memory of the client device, the application to forward the authentication answer message to the relying party to complete the authentication operation;
the application within the virtualized session serving as a conduit for each authentication operation being performed between the client device and the relying party.

2. The virtual delivery appliance of claim 1 wherein the client device comprises a biometric device configured to generate the biometric characteristic of the user.

3. The virtual delivery appliance of claim 1 wherein the client device comprises a local wireless transceiver configured to exchange the authentication challenge message and the authentication answer message with a mobile wireless communication device.

4. The virtual delivery appliance of claim 1 wherein the application comprises a web browser application.

5. The virtual delivery appliance of claim 4 wherein said processor is configured to receive a web authentication application programming interface (API) command from the relying party.

6. The virtual delivery appliance of claim 5 wherein said processor is configured to translate the web authentication API command from the relying party into the authentication challenge message; and wherein the client device is configured to generate the web authentication API command based upon the authentication challenge message.

7. The virtual delivery appliance of claim 5 wherein the web authentication API command comprises a WebAuthn standard authentication command.

8. The virtual delivery appliance of claim 1 wherein said processor is configured to translate the authentication OS command from the relying party into the authentication challenge message; and
wherein the client device is configured to reconstruct the authentication OS command based upon the authentication challenge message.

9. A computing system comprising:
a client device; and
a virtual delivery appliance configured to communicate with said client device over a network to
provide said client device with a virtualized session for a user,
communicate with said client device over the network to perform a registration operation between a relying party and the client device, an application operating within a virtual operating system (OS) comprising a native authentication interface, the application to perform an authentication operation between the client device and the relying party to access a resource,
intercept by the application an authentication OS command of the native authentication interface from the relying party, and translate the authentication OS command into an authentication challenge message,
redirect the authentication challenge message to the client device for the user to access the resource, and
receive an authentication answer message in response to the authentication challenge message from said client device, the authentication answer message being based upon a biometric characteristic of the user accessible from a memory of said client device, the application to forward the authentication answer message to the relying party to complete the authentication operation;

the application within the virtualized session serving as a conduit for each authentication operation being performed between the client device and the relying party.

10. The computing system of claim 9 wherein said client device comprises a biometric device configured to generate the biometric characteristic of the user.

11. The computing system of claim 9 wherein said client device comprises a local wireless transceiver configured to exchange the authentication challenge message and the authentication answer message with a mobile wireless communication device.

12. The computing system of claim 9 wherein the application comprises a web browser application.

13. The computing system of claim 12 wherein said virtual delivery appliance is configured to receive a web authentication application programming interface (API) command from the relying party.

14. The computing system of claim 13 wherein said virtual delivery appliance is configured to translate the web authentication API command from the relying party into the authentication challenge message; and wherein said client device is configured to generate the web authentication API command based upon the authentication challenge message.

15. The computing system of claim 13 wherein the web authentication API command comprises a WebAuthn standard authentication command.

16. A method for operating a virtual delivery appliance, the method comprising:
communicating with a client device over a network to provide the client device with a virtualized session for a user;
communicating with the client device over the network to perform a registration operation between a relying party and the client device, an application operating within a virtual operating system (OS) comprising a native authentication interface, the application to perform an authentication operation between the client device and the relying party to access a resource;
intercepting by the application an authentication OS command of the native authentication interface from the relying party, and translating the authentication OS command into an authentication challenge message;
redirecting the authentication challenge message to the client device for the user to access the resource; and
receiving an authentication answer message in response to the authentication challenge message from the client device, the authentication answer message being based upon a biometric characteristic of the user accessible from a memory of the client device, the application to forward the authentication answer message to the relying party to complete the authentication operation, the application within the virtualized session serving as a conduit for each authentication operation being performed between the client device and the relying party.

17. The method of claim 16 wherein the client device comprises a biometric device configured to generate the biometric characteristic of the user.

18. The method of claim 16 wherein the client device comprises a local wireless transceiver configured to exchange the authentication challenge message and the authentication answer message with a mobile wireless communication device.

19. The method of claim 16 wherein the application comprises a web browser application.

20. The method of claim 19 further comprising receiving a web authentication application programming interface (API) command from the relying party.

21. The method of claim 20 further comprising translating the web authentication API command from the relying party into the authentication challenge message; and wherein the client device is configured to generate the web authentication API command based upon the authentication challenge message.

22. The method of claim 20 wherein the web authentication API command comprises a WebAuthn standard authentication command.

* * * * *